US010734888B1

(12) United States Patent
Halberstadt

(10) Patent No.: US 10,734,888 B1
(45) Date of Patent: Aug. 4, 2020

(54) POWER FACTOR CORRECTOR CIRCUIT WITH DISCONTINUOUS AND CONTINUOUS CONDUCTION MODES BASED ON DESIRED PEAK AND INPUT CURRENTS

(71) Applicant: NXP B.V., Eindhoven (NL)

(72) Inventor: Hans Halberstadt, Groesbeek (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/457,819

(22) Filed: Jun. 28, 2019

(51) Int. Cl.
*H02M 1/42* (2007.01)

(52) U.S. Cl.
CPC ................. *H02M 1/4225* (2013.01)

(58) Field of Classification Search
CPC .................................................. H02M 1/4225
See application file for complete search history.

(56) References Cited

U.S. PATENT DOCUMENTS

| | | | |
|---|---|---|---|
| 8,351,232 B2 | 1/2013 | Zhang | |
| 8,599,579 B2 | 12/2013 | Kuebrich et al. | |
| 9,479,046 B2 | 10/2016 | Lin et al. | |
| 9,621,028 B2 | 4/2017 | Lin et al. | |
| 2014/0097808 A1* | 4/2014 | Clark | G05F 1/70 323/208 |
| 2014/0252990 A1* | 9/2014 | Maru | H02M 3/33507 315/307 |
| 2015/0303790 A1* | 10/2015 | Lin | H02M 1/4225 363/89 |

OTHER PUBLICATIONS

Power Factor Correction, "Improving Efficiency and Power Factor at Light Load", Issue 3, 2016 Power Electronics Europe, www.power-mag.com, 3 pgs., 2016.
On Semiconductor, "Power Factor Correction Stages Operating in Critical Conduction Mode", AND8123/D, Nov. 2014, Rev. 2, 18 pgs., 2014.
Monolithic Power Systems, "MPS HR1200: PFC+LLC Combo Controller", 30 pgs., Jan. 7, 2016.
Wikipedia, "Mains electricity", retrieved from the internet at https://en.wikipedia.org/wiki/Mains_electricity, on Oct. 9, 2018, 9 pgs.
Monolithic Power Systems, "HR1200 High Performance PFC+LLC Combo Controller", 34 pgs., 2017.

* cited by examiner

*Primary Examiner* — Harry R Behm

(57) ABSTRACT

A power factor corrector circuit and a method of operating the power factor corrector circuit can include a power factor corrector, wherein two or more input variables can be defined for the power factor corrector including a peak current and an input current. A processor can select corresponding variables in the power factor corrector with respect to the two or more input variables defined for the power factor corrector, and the corresponding variables can include a peak current and an input current. The corresponding variables in the power factor corrector can adapt to the two or more input variables to allow the power factor corrector to operate in a conduction mode.

17 Claims, 19 Drawing Sheets

POWER FACTOR CORRECTOR CIRCUIT WITH DISCONTINUOUS AND CONTINUOUS CONDUCTION MODES BASED ON DESIRED PEAK AND INPUT CURRENTS

BACKGROUND

General electric alternating current (AC) power ("mains power" or "mains electricity" or simply "mains") may need to be converted into direct current (DC) power for use by various electronic consumer devices. A power management system can convert AC power from a main power source into DC power using components that experience low losses in power dissipation, such as, for example, inductors, diodes, capacitors, transformers and other switches (e.g., junction gate field-effect transistors, metal-oxide-semiconductor field-effect transistors, etc.). Losses in the main source may be decreased by focusing on the harmonics of the current drawn from the main source and the phase relationship between the mains voltage and the current drawn from the main source. The efficiency of the mains power source can be measured by a power factor. The power factor of an AC to DC electric power system can be defined as the ratio of the real power drawn from the main source compared to the product of the root means square (rms) voltage $V_{rms}$ and the rms current $I_{rms}$.

A power factor corrector (PFC), which may include a bridge rectifier, a switch-mode power supply (SMPS), and control circuits, can be used to help maximize the power factor in power management systems and can also be used for power management in personal computers, adapters, lighting, and so on. The power factor can therefore be a significant parameter in evaluating a PFC's overall performance.

A PFC circuit can be used in applications such as power converters to control the phase of the input current and help maximize power in power management systems. A PFC circuit, which can also referred to simply as a "PFC", may be needed for an SMPS having power levels above, for example, 75 watts. For a power level above approximately 300 watts, a CCM (Continuous-Conduction Mode) operation becomes attractive because this can allow for the use of small EMI (Electromagnetic Interference) filters.

Some PFC circuits can use fixed frequency in CCM applications. Close to the main zero-crossing, CCM cannot be maintained, and a changeover from a BCM (Boundary Conduction Mode) to a DCM (Discontinuous Conduction Mode) may occur in association with a rising frequency. Unfortunately, this feature can result in a lower efficiency close to the main zero-crossing.

For optimum efficiency, it may be advantageous to use CCM at higher power levels around the peak voltage of the main power supply and then use DCM in other situations.

Some DCM applications may employ a topology involving Ton (Timer On) control for the PFC switch. Ton control can offer the advantage for BCM of automatically correcting the mains current shape for a high power factor. This is because $di/dt=V_{mains}/L_{ind}$, wherein $L_{ind}$ is the main inductor value and $V_{mains}$ represents the mains voltage. Thus, with a fixed Ton, the primary peak current can be proportional to the momentary mains voltage. For CCM, the primary current can depend on the current at the end of the previous switching cycle and the switch conduction interval Ton. Therefore, on time control in the manner used in DCM cannot be employed in CCM operations.

Some CCM operational techniques use a method referred to as "average current control". This approach can be based on the fact that the duty cycle of the secondary stroke equals $V_{in}/V_{out}$ where $V_{in}$ represents the input voltage of the PFC and $V_{out}$ represents the output voltage. FIG. 1 depicts a waveform diagram 100 illustrating the concept of average current control CCM. The waveforms shown in FIG. 1 demonstrate that when the duty cycle becomes smaller than the equilibrium value, the duration of the secondary stroke may also become smaller. This situation offers less reduction for the inductor current and therefore can result in an increase in the current as compared to the current at the start of the switching cycle (e.g., see curve 102 in FIG. 1).

When the duty cycle is higher than the equilibrium, an increase in the reduction of the inductor current can occur, and therefore a decrease in the current can also occur as compared to the current at the start of the switching cycle (e.g., see curve 106 in FIG. 1). A signal indicative of the duty signal can be generated by a ramp signal 108 (ramp for PWM (Pulse Width Modulation)) and a control signal 110. The ramp signal 108 and control signal 110 can be subject to a comparison operation by a comparator, which can generate the signal indicative of the duty cycle. This means that equilibrium can occur when the control signal 110 is proportional to $V_{in}/V_{out}$. As the output voltage '$V_{out}$' may be normally regulated to a fixed value, the result can be that the control signal may be proportional to $V_{in}$. By making the control signal 110 proportional to the sensed current, the system can generate an input current proportional to the momentary mains voltage, which can fulfill the power factor requirement.

FIG. 2 depicts a schematic diagram of a PFC circuit 130 that applies the average current control principle. The circuit 130 shown in FIG. 2 can include a pair of diodes 132, 124 and another pair of diodes 136, 138. The diodes 134 and 138 can connect to ground 140. An inductor 144 can connect to diodes 132 and 138, and can also connect to ground 140.

The circuit 130 can further include an oscillator 146 that can connect to the negative input of an amplifier 148 that provides PWM waveforms that can be supplied to a transistor 150. The inductor 144 can also connect to the transistor 140 and a diode 152. An output capacitor 154 can connect to the output of the diode 152 and ground 141. The output capacitor 154 can be located between a ground output ("Out Gnd") and the output of the diode 152.

The circuit 130 can further include a resistor 158 ("$R_{op}$") that can be coupled to a shunt resistor 156 ("$R_{shunt}$"), ground 140 and the diodes 138 and 134. The shunt resistor 156 can be further connected to a resistor 160, which in turn can be coupled to a capacitor 164 and a current amplifier 162. The capacitor 164 can be further coupled to a capacitor 166 and a resistor 168, which can also be tied to the output of the current amplifier 162. The capacitor 166 and the resistor 168 can be connected in parallel with one another and can further connect to the positive input of the amplifier 148 along with the output of the current amplifier 162. That is, the current amplifier output ("$V_{ca}$") can connect to the positive input of the amplifier 148.

FIG. 3 depicts a schematic diagram of a control circuit 180 that utilizes a multiplier approach. The circuit 180 generally includes an AC voltage source 182 that can be offset by a diode 184. The AC voltage source 182 can supply a voltage $V_{AC}$ to a resistor 186 ("$R_{IAC}$") and an inductor 212. The resistor 186 can be coupled to a multiplier 188 that in turn can connect to a resistor 190 and the positive input of an amplifier 192 whose output can connect to a latch 194. The latch 194 in turn can be coupled to a gate driver logic component 200 that in turn can connect to a transistor 219.

A resistor 198 can further connect to the transistor 214 and ground 196. The transistor 214 can be further coupled to the inductor 212 and a diode 216. A capacitor 218 can connect to the diode 216 and to the resistor 198 (and also to ground 196). The capacitor 218 can also be implemented in parallel with a load 220. A resistor 210 can connect to the capacitor 218 and the diode 216 and also to a resistor 208 and the negative input of an error amplifier 202 that can output a voltage $V_{EA}$. The resistor 208 can also be coupled to ground 206. A reference voltage 204 ("$V_{REF}$") can connect to the positive input of the error amplifier 202. The output from the error amplifier 202 in turn can be coupled to the multiplier 188.

In the configuration of circuit 180, the control voltage $V_{EA}$ that can be output from the error amplifier 202 can set the desired power level so that the PFC output voltage may be equal to the desired level while delivering power to the load 220. The multiplier 188 can then multiply the control output signal with the mains voltage shape so as to provide a desired current level, which can be then compared with a sensed current level and used to reset the latch 194 in order to define a primary current peak level. The switching cycle can be started by a Zcd (zero current detection) signal in order maintain the system in a BCM.

For a system in BCM operation, the input current as drawn from the mains can be proportional to the primary peak current and also proportional to the "on time" of the PFC switch. This makes it easy to render a satisfactory power factor. When the system goes to DCM, the average current may be lower for the same primary peak current, because of the ringing interval that arises after the end of the secondary stroke where no current may be drawn from the mains. Some configurations may use a PFC where this effect can be compensated by an additional adaption of the primary peak current based on a ratio: Tper/(Ton+Tsec).

FIG. 4 depicts a group of equations 230 that can define factors for a PFC circuit. Providing for a high power factor means that the input current drawn by the PFC may be proportional to the momentary mains voltage. Ideally, this can be represented by defining a factor k2 according to the equations 230 shown in FIG. 4. That is:

$$I\text{in} = k2 \cdot V\text{mains}$$

$$P\text{in} = V\text{mains} \cdot I\text{in}$$

$$P\text{in} = V\text{mains} \cdot (k2 \cdot V\text{mains})$$

$$P\text{in} = V\text{mains}^2 \cdot k2$$

Thus, the momentary input current may equal the momentary mains voltage times a factor k2. This means that the momentary input power may be proportional to the square of the momentary input voltage.

FIG. 5 depicts a graph 240 and a graph 250, which demonstrate the relationship between momentary current voltage and power for a PFC circuit according to the equations 230 shown in FIG. 4. Graph 240 and curve 242 plot data indicative of Vmains(t) with respect to time t based on the equation Pin (t,K2):=Vmains(t)2·k2 wherein k2b:=0.002. Graph 250 depicts a curve 252 and a curve 254 respectively for Pin(t,k2b) and Pin(T,k2Aa) wherein k2a=1× $10^{-3}$ and k2b=2×$10^{-3}$.

FIG. 6 depicts a graph 260 depicting average power over a mains half cycle for a PFC circuit. A curve 262 and a curve 264 in graph 260 demonstrate that for the average power over a mains half cycle, the average value of the power is half of the peak value of the square of a sine wave:

$$\text{Pin\_av}(k2, V\text{mainspeak}) = \frac{V\text{mainspeak}^2}{2} \cdot k2$$

Thus, fixing k2 may mean that the power level can be proportional to the square of the mains voltage amplitude. Accordingly, the gain of the closed loop can be proportional to the square of the mains voltage amplitude. In some cases, it may be desirable to have a fixed gain of the total control loop. A constant gain may prevent a 0 db loop gain frequency for closed loop shifts. In this manner, an optimum dynamic response may be possible for universal mains voltage while maintaining optimum stability for the loop.

K2 therefore can include a mains voltage that may be compensated by 1/Vmains^2, which can allow the gain from the control to output power to be compensated for the mains voltage amplitude.

In a practical PFC application, it may not be easy to define behavior according to this desired factor K2. DCM controllers, for example, can may on time control with BCM or fixed frequency DCM. In BCM, the factor K2 may be more or less defined as a fixed on time, which can cause a peak current, 'Ipeak', to be proportional to the momentary mains voltage, and thus in BCM, the input current may be proportional to 'Ipeak/2', which may also be proportional to the mains voltage. In DCM with fixed frequency, the average current may be no longer 'Ipeak/2' because of the changing ratio between the primary+secondary stroke and a period of time.

With conventional techniques and circuits such as discussed above, it may be possible to configure a CCM PFC circuit or a DCM PFC circuit. To date, DCM and CCM have not been combined in a manner that allows a PFC circuit to operate for DCM and CCM within a main half cycle. In addition, the loop gain and dynamic behavior are different in CCM and DCM in PFC circuits, which can make it more complex to define the closed loop and obtain a dynamic performance. Another problem with PFC circuits relates to potential instabilities (e.g., short long cycles) that can occur in CCM for a duty cycle greater than 50%. In addition, the operating frequency in BCM can lead to large frequencies during part of the mains half cycle.

Accordingly, there is a long-felt need for AC/DC power converters employed in power management systems to address the foregoing problems.

SUMMARY

Embodiments of a method and a device are disclosed.

In an embodiment, a power factor corrector circuit can include a power factor corrector, wherein at least two input variables are defined for the power factor corrector, wherein the at least two input variables include a peak current and an input current, and a processor that selects corresponding variables in the power factor corrector with respect to the at least two input variables defined for the power factor corrector, and wherein the corresponding variables include a peak current and an input current, and wherein the corresponding variables in the power factor corrector are adapted to the at least two input variables to allow the power factor corrector to operate in a conduction mode.

In an embodiment, the conduction mode can comprise a DCM (Discontinuous-Conduction Mode).

In an embodiment, the conduction mode can comprise a CCM (Continuous-Conduction Mode).

In an embodiment, the conduction mode can comprise at least one of: a DCM (Discontinuous-Conduction Mode) and a CCM (Continuous-Conduction Mode).

In an embodiment, the power factor corrector circuit can further include a switching converter unit that communicates with the processor, wherein: a first peak current is applied according to the peak current, a second peak current is calculated based on the first peak current and the input current, a factor is calculated based on the first peak current and the second peak current, and the switching converter unit is driven using the applied first peak current and the calculated second peak current.

In an embodiment, a measured operating frequency and an upper frequency limit can determine a correction factor that is operable to adapt the first peak current to a value that results in a switching frequency that fits to an upper frequency limit.

In an embodiment, a minimum operating frequency can be used to determine the correction factor.

In an embodiment, the switching converter unit includes at least one of a boost converter circuit, a bridgeless power factor corrector circuit, and an interleaved boost converter circuit.

In an embodiment, a power factor corrector circuit, can include a power factor corrector, wherein at least two input variables are defined for the power factor corrector, wherein the at least two input variables include a peak current and an input current, and a processor that selects corresponding variables in the power factor corrector with respect to the at least two input variables defined for the power factor corrector, and wherein the corresponding variables include a peak current and an input current, and wherein the corresponding variables in the power factor corrector are adapted to the at least two input variables to allow the power factor corrector to operate in a conduction mode comprising at least one of a DCM (Discontinuous-Conduction Mode) and a CCM (Continuous-Conduction Mode).

In an embodiment, the power factor correction can include a switching converter unit that communicates with the processor, wherein: a first peak current is applied according to the peak current, a second peak current is calculated based on the first peak current and the input current, a factor is calculated based on the first peak current and the second peak current, and the switching converter unit is driven using the first peak current and the second peak current and at a start of a next primary stroke based on a measured duration of the primary and secondary stroke and the factor.

In an embodiment, a measured operating frequency and an upper frequency limit can determine a correction factor that is operable to adapt the first peak current to a value that results in a switching frequency that fits to an upper frequency limit, and a minimum operating frequency can be used to determine the correction factor.

In an embodiment, the switching converter unit can include at least one of a boost converter circuit, a bridgeless power factor corrector circuit, and an interleaved boost converter circuit.

In an embodiment, a method of operating a power factor corrector circuit, can involve defining at least two input variables for a power factor corrector, wherein the at least two input variables include a peak current and an input current, selecting corresponding variables in the power factor corrector with respect to the at least two input variables defined for the power factor corrector, wherein the corresponding variables include a peak current and an input current, and adapting the corresponding variables in the power factor corrector to the at least two input variables to allow the power factor corrector to operate in a conduction mode.

In an embodiment of the method, the conduction mode can comprise a DCM (Discontinuous-Conduction Mode).

In an embodiment of the method, the conduction mode can comprise a CCM (Continuous-Conduction Mode).

In an embodiment of the method, the conduction mode can comprise at least one of: a DCM (Discontinuous-Conduction Mode) and a CCM (Continuous-Conduction Mode).

An embodiment of the method can further involve applying a first peak current according to the peak current, calculating a second peak current based on the first peak current and the input current, calculating a factor based on the first peak current and the second peak current, and driving a switching converter unit using the first peak current and the 3 second peak current and at a start of a next primary stroke based on a measured duration of the primary and secondary stroke and the factor.

In an embodiment of the method, a measured operating frequency and an upper frequency limit can determine a correction factor that is operable to adapt the first peak current to a value that results in a switching frequency that fits to an upper frequency limit.

In an embodiment of the method, a minimum operating frequency can be used to determine the correction factor.

In an embodiment of the method, a current peak value can be limited to a minimum amount by a local loop that detects how the switching converter unit operates in the conduction mode and increases a peak current until a particular amount of the conduction mode is maintained.

BRIEF DESCRIPTION OF THE DRAWINGS

Throughout the description, similar reference numbers may be used to identify similar elements.

DETAILED DESCRIPTION

Figure 1:
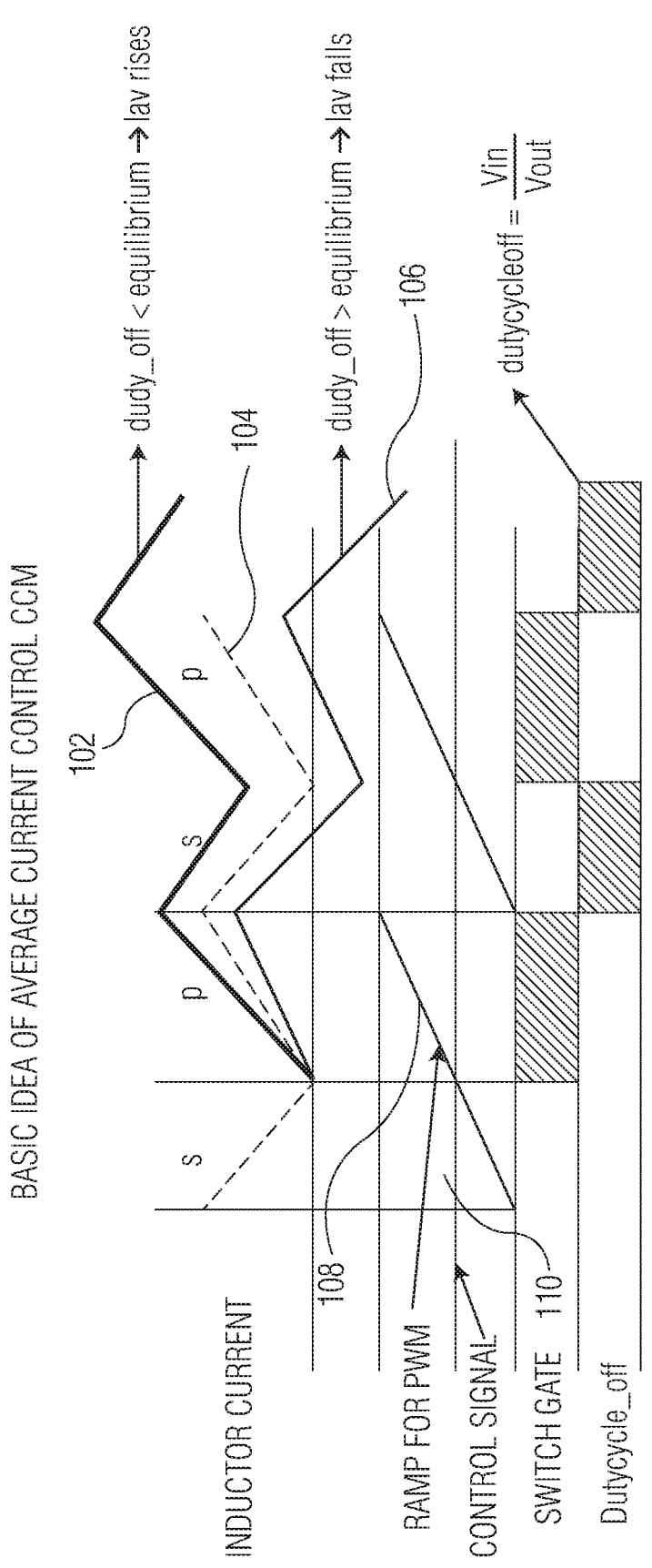
FIG. 1 depicts a waveform diagram illustrating the concept of average current control CCM.
Figure 2:
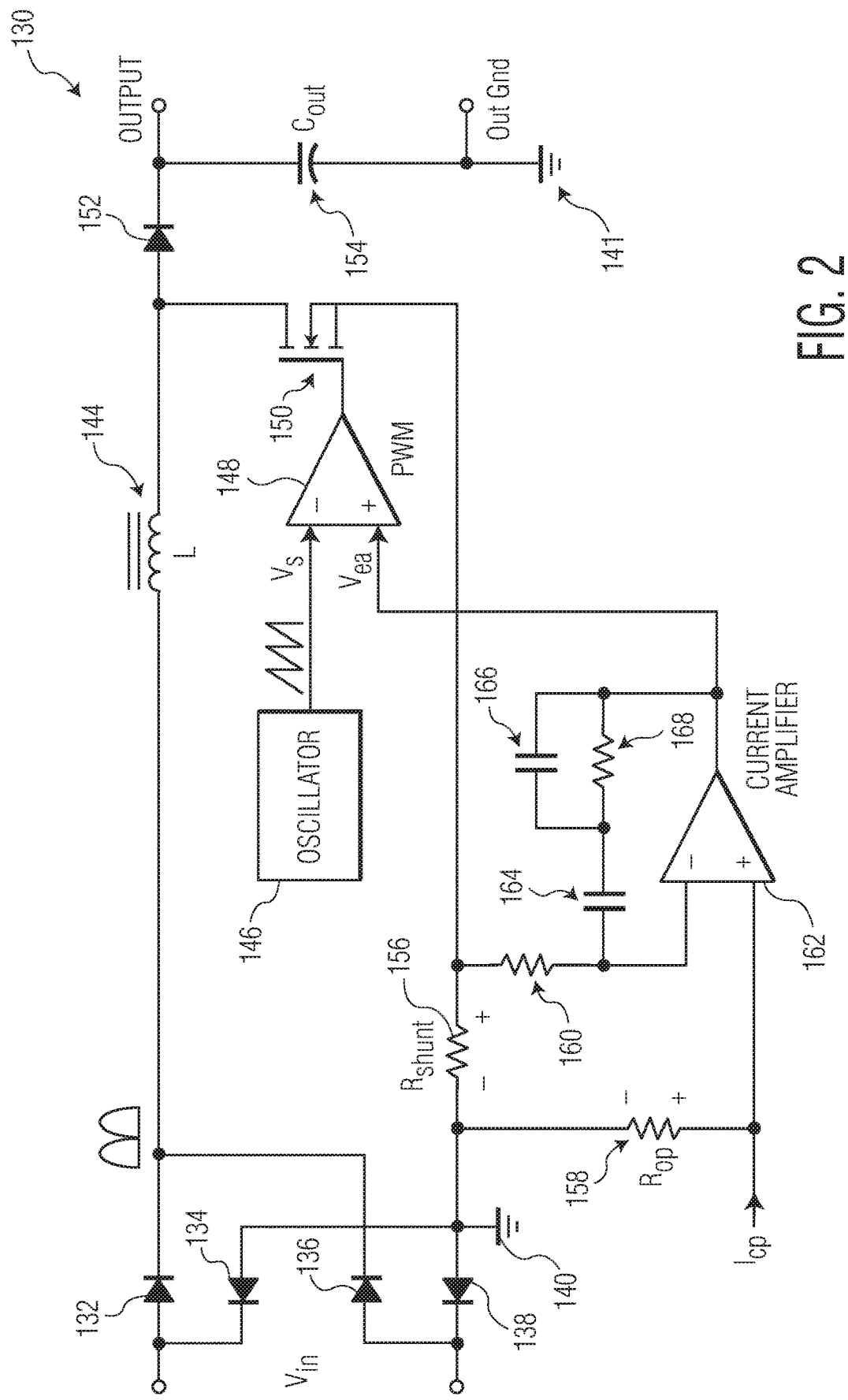
FIG. 2 depicts a schematic diagram of a PFC circuit that uses the average current control principle.
Figure 3:
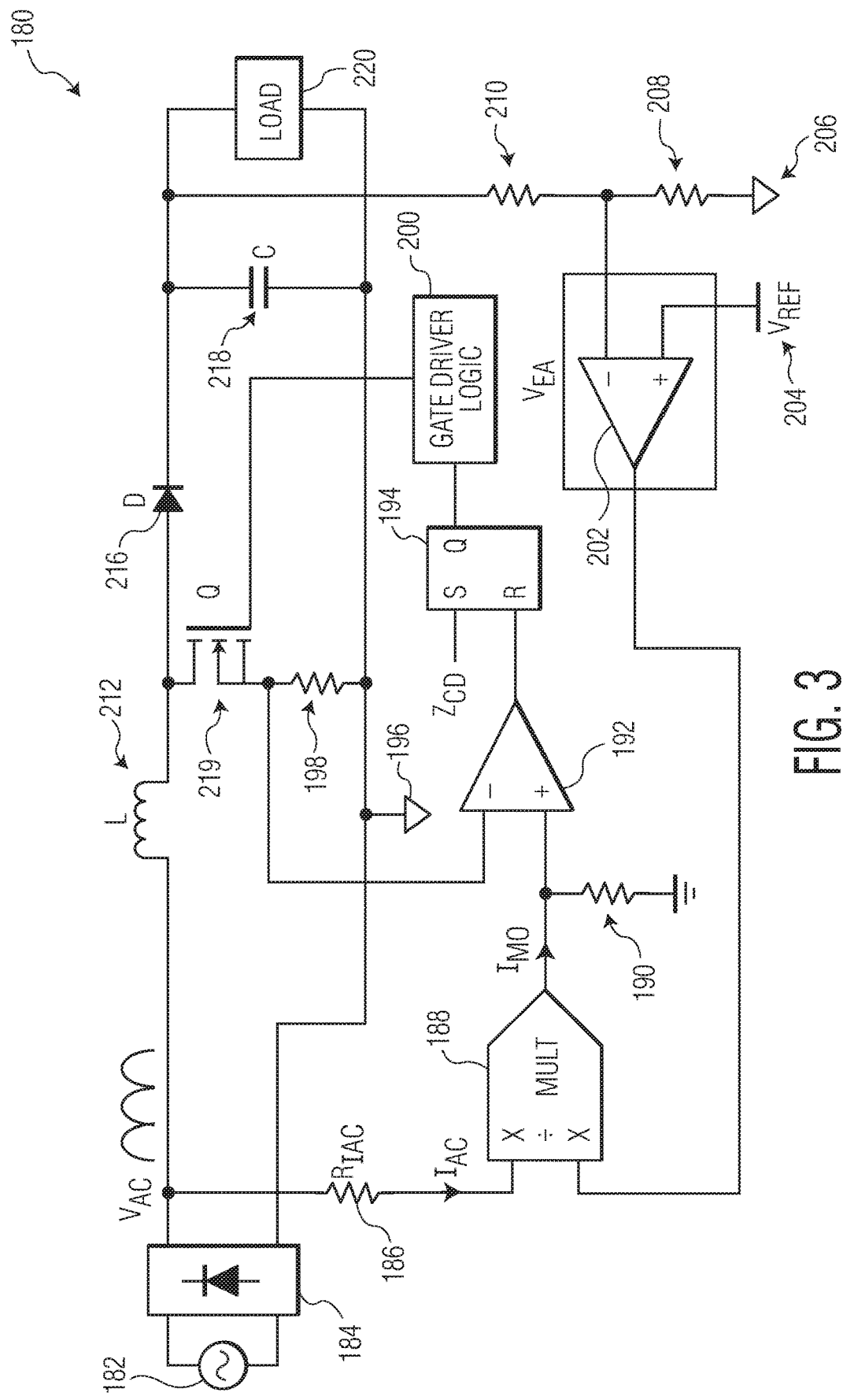
FIG. 3 depicts a schematic diagram of a control circuit using a multiplier approach.
Figure 4:
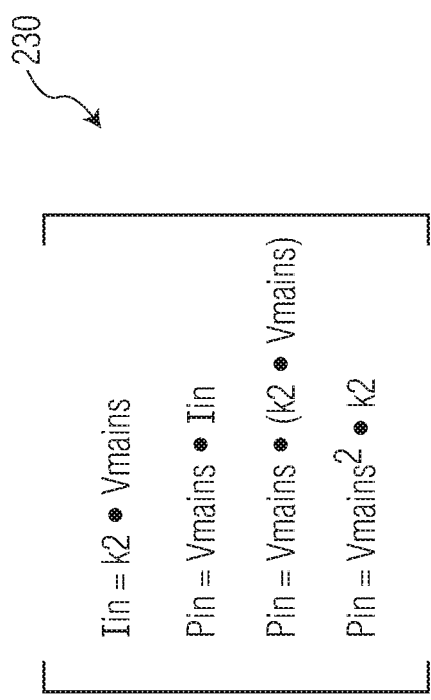
FIG. 4 depicts a group of equations that defines factors for a PFC circuit.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes, which come within the meaning and range of equivalency of the claims, are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Several aspects of the disclosed embodiments are presented with reference to various systems, methods and devices. These systems, methods and devices are described in the following detailed description and illustrated in the accompanying drawings by various blocks, modules, components, circuits, steps, operations, processes, algorithms, engines, applications, etc. (which can be individually or collectively referred to as "elements"). These elements may be implemented using electronic hardware, computer software, or any combination thereof. Whether such elements are implemented as hardware or software depends upon the particular application and design constraints imposed on the overall system.

The disclosed embodiments are related to a PFC capable of operating in DCM or CCM, wherein two or more desired input variables can be defined and an algorithm can be implemented, which can handle adapting corresponding variables in the PFC to adapt to the desired input variables. In an embodiment, the two (or more) input variables are preferably the desired operating frequency and the desired input current and the two corresponding variables are preferably the operating frequency and the input current.

As will be discussed in greater detail herein, the PFC can be configured to operate at least in part according to an algorithm that is based on an estimation of partial derivatives and solving a set of two equations using the partial derivatives. Such an algorithm can further involve steps or operations for driving a switching converter unit using a first peak current "Ipeakh", a ratio 'a' and a second peak current "Ipeakl" that can be determined accordance to an equation: Ipeakl=F(a,Ipeakh).

Additionally, a processing unit can receive two error signals, the first error signal being the difference between a desired switching frequency and a measured switching frequency, the second error signal being the difference between a desired average input current and a measured average input current. The processing unit can then output the first peak current 'Ipeakh' and the ratio 'a' based on the received error signals. An element is also disclosed, which can limit the operating mode to DCM by calculating the frequency for BCM (=CCM/DCM border) and can further limit the desired switching frequency. In addition, the PFC can include elements such as, for example, a boost converter, a bridgeless PFC and an interleaved boost converter. Note that as utilized herein, the terms PFC, "PFC circuit", power factor corrector, and power factor corrector circuit can be utilized interchangeably to refer to the same or a similar future.

Figure 7:
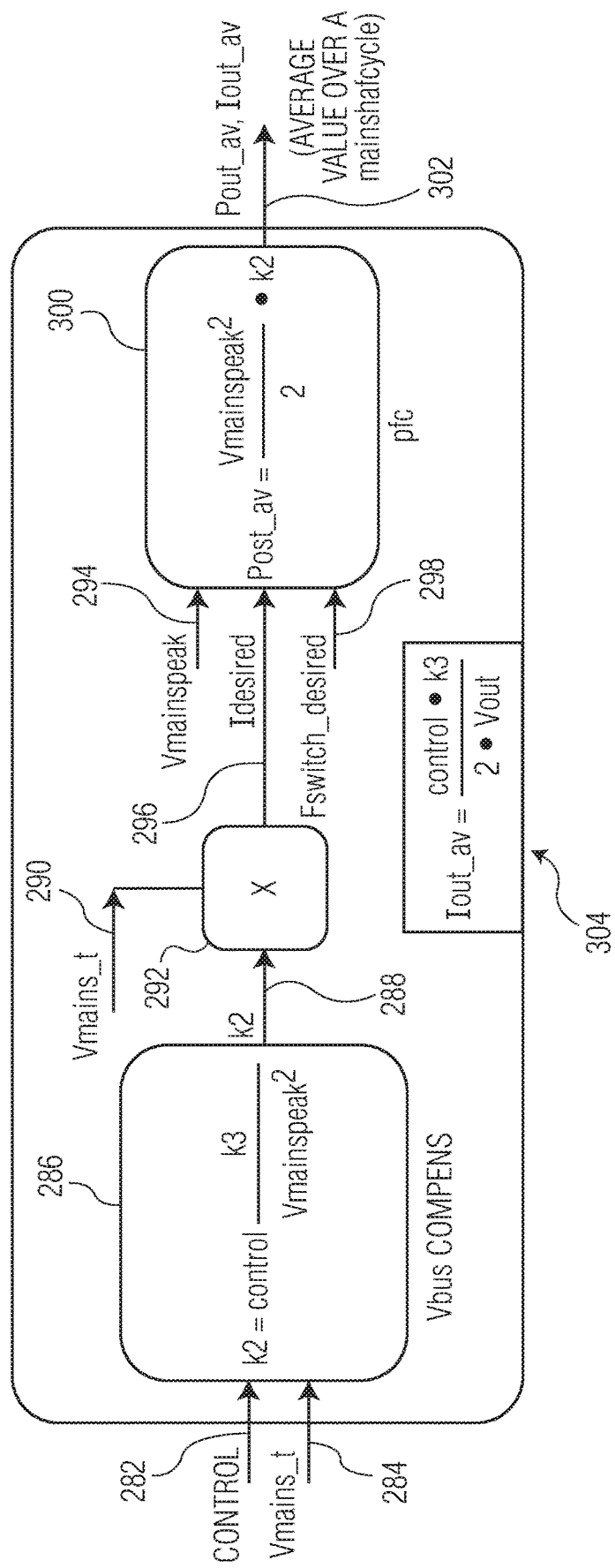
FIG. 7 depicts a block diagram of a PFC system in which the desired input current and desired frequency can be met.

Accordingly, FIG. 7 illustrates a flow diagram depicting logical operations of a control method for a PFC circuit in which the desired input current (e.g., the average current over a switching cycle) and the desired frequency can be met. In the embodiment depicted in FIG. 7, these two parameters can be set independently from each other. The desired input current can be then defined using, for example, a multiplier approach as discussed in more detail herein.

As shown in FIG. 7, a 'control' signal 282 can be provided via a main regulation loop (not shown in FIG. 7) to generate a signal 'k2' as input for a multiplier. A momentary voltage 284 ('Vmains') together with the control signal 282 can be subject to a voltage compensation operation as indicated at block 286 (i.e., the 'Vbus' compensation block), the result of which can be the output of a '2' signal as indicated by arrow 288. Note that the parameter 'k2' (also referred to as 'K2' in some instances) can relate to the input control level.

The transfer from control to 'k2' can include the mains voltage compensation operation depicted at block 286. The parameter 'k2' output from block 286 can be then multiplied, as depicted at block 292, by the momentary 'Vmains' voltage represented by arrow 290 to obtain a desired input current shape, 'Idesired', as indicated at arrow 296, for the PFC. The PFC is depicted at block 300. The 'Idesired' input can possess the proper shape for fulfilling the power factor requirement.

Note that the PFC can also receive as input, a desired switching frequency ('Fswitch_desired'), as shown at arrow 298, and the mains peak voltage ('Vmainspeak2') as indicated by arrow 294. The resulting output 302 can be the average value over a mains half cycle. The equation 304 shown in FIG. 7 describes the average output current 'Iout_av'.

Note that the terms mains, mains voltage, mains power, mains electricity, and so on as utilized herein can relate to a general-purpose AC electric power supply. This is the form of electrical power that can be delivered to, for example, homes and business, and may be in the form of electrical power that consumers use when plugging domestic appliances, televisions, electric lamps, and so on, into wall outlets. In the United Kingdom and Canada, the term "mains electricity" is typically used and the United States refers to terms such as grid power, wall power, and domestic power to refer to main, mains power, mains voltage and mains electricity.

Figure 8:
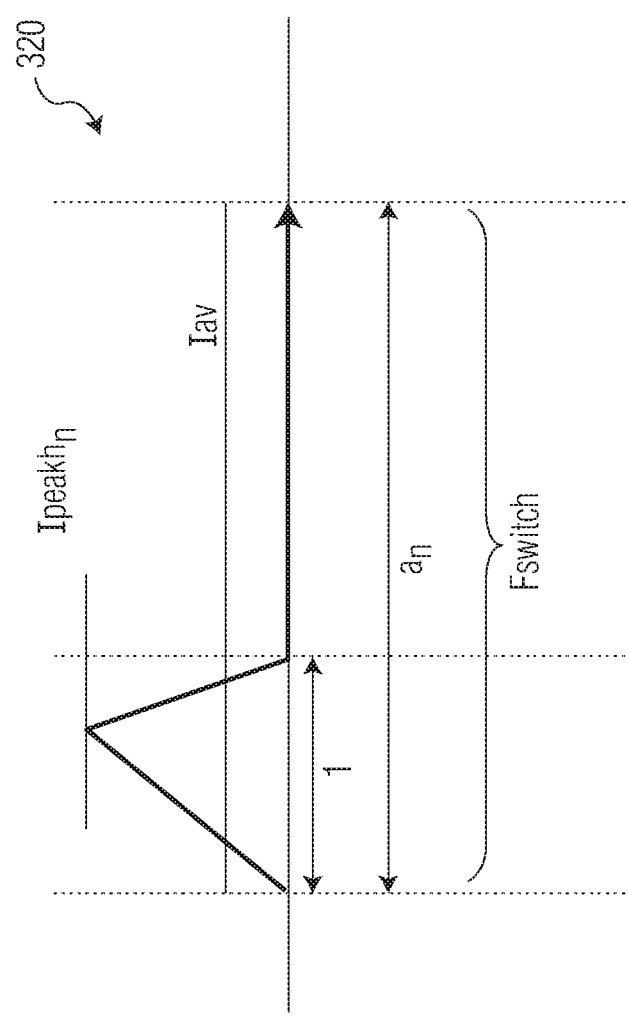
FIG. 8 depicts a waveform representative of the input current (neglecting parasitic ringing effects) of a PFC operating in DCM.

FIG. 8 depicts a waveform 320 representative of the input current (neglecting parasitic ringing effects) of a PFC operating in DCM. After attaining the desired current 'Ipeakh' during the primary stroke, the current can fall back to zero at the end of the secondary stroke. Note that in the waveform 320 shown in FIG. 8, the duration of the primary+secondary stroke can be scaled to a value of 1. Then, a factor 'a' can be defined as the ratio between the primary+secondary stroke and the total period time (=1/Fswitch).

A frequency Fbcm (i.e. the BCM frequency) can be defined as the frequency that can occur if at the given 'Ipeakh', the system may be forced to operate in BCM (boundary conduction mode). For a=1, a BCM operation can occur, the switching frequency for given 'a' can be determined as shown in equation (1):

$$Fswitch = \frac{Fbcm}{a} \quad (1)$$

While the average current 'Iav_in' over a switching cycle can be determined as shown in equation (2):

$$\text{Iav\_in} = \frac{Ipeakh}{2 \cdot a} \quad (2)$$

Figure 9:
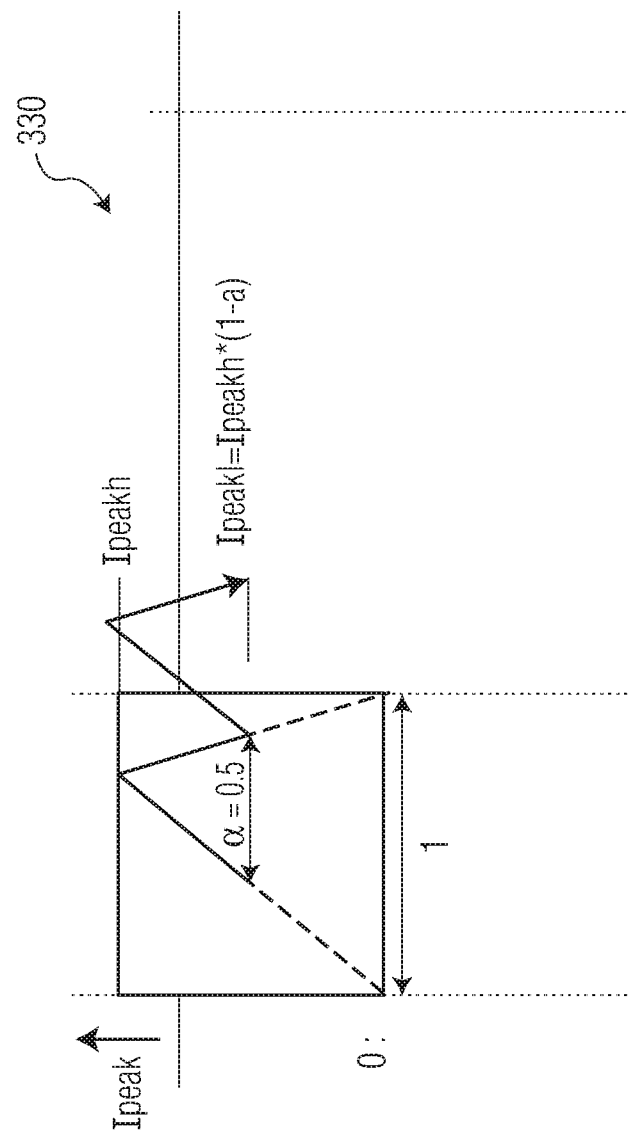
FIG. 9 depicts an example waveform for a PFC in which the same equation for the switching frequency is capable of being used for DCM and CCM operations.

Based on the equation for the switching frequency 'Fswitch', this concept can be extended for a CCM operation, as shown in FIG. 9, which depicts an example waveform 330 for a PFC in which the same equation for the switching frequency can be used for DCM and CCM operations. Taking the proposed relation between 'Ipeakh', 'Ipeakl' and 'a', the same equation for the switching frequency can be used for DCM and CCM operation. For example if a=0.5, Ipeakl=Ipeakh(0.5) may be needed, which can result in Fswitch=Fbcm/0.5. In general for a<1 equation (3), equation (4), and equation (5) in CCM can result as follows:

$$Ipeakl = Ipeakh \cdot (1-a) \quad (3)$$

$$Iavccm = Ipeakh \cdot \left(1 - \frac{a}{2}\right) \quad (4)$$

$$Fswitch = \frac{Fbcm}{a} \quad (5)$$

Figure 10:
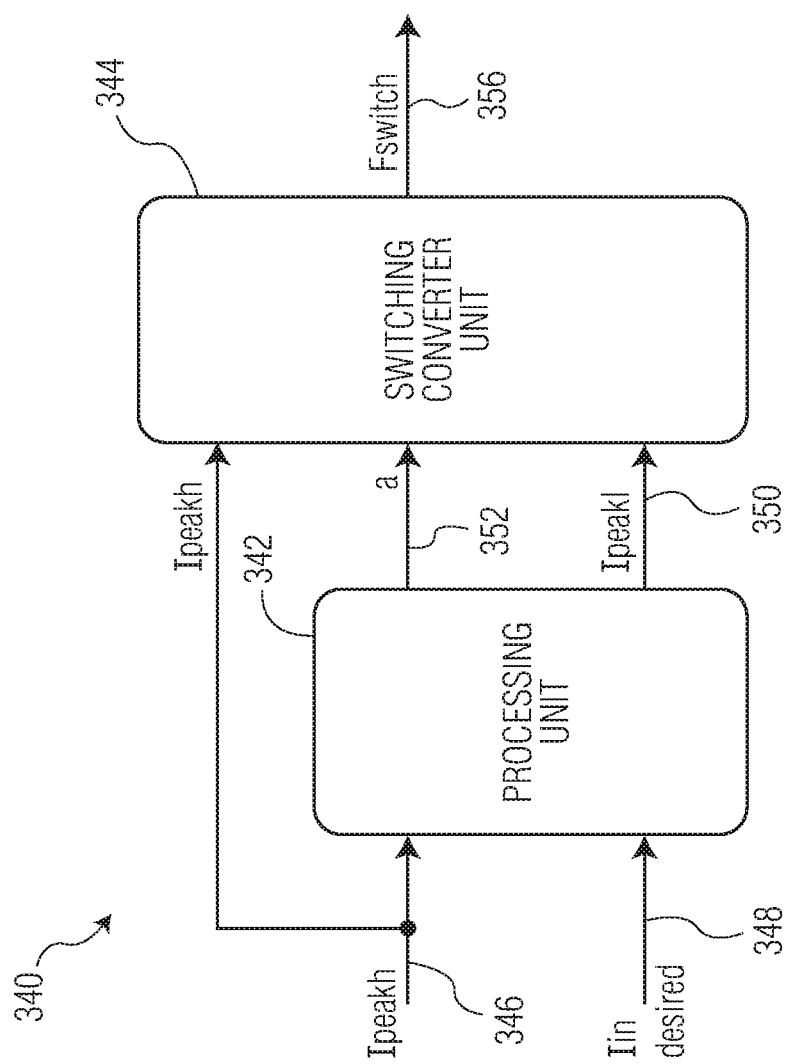
FIG. 10 depicts a block diagram of a PFC system that follows a desired peak current.

FIG. 10 depicts a block diagram of a PFC system 340 that can follow a desired peak current. The PFC system 340 generally includes a processing unit 342 that receives as input, a peak current 'Ipeakh' as shown at arrow 346 together with a desired current 'Iin_desired' as indicated by arrow 348. The processing unit 342 can output a peak current 'ipeakl' as shown at arrow 350 and 'a' as shown at arrow 352, which can be then fed as input to a switching converter unit 344, which in turn can output a switching frequency 'Fswitch' as indicated at arrow 356. The input peak current 'ipeakh' shown at arrow 346 can also be input to the switching converter unit 344 along with 'a' and the peak current 'ipeakl' respectively shown at arrows 352 and 350.

Thus, in the embodiment shown in FIG. 10, the PFC system 340 can follow a desired peak current. That is, 'Ipeakh' and 'Iin_desired' can represent desired inputs. In this case, 'Ipeakh' can be directly applied and based on the desired input current 'Iin_desired'. The values for 'Ipeakl' and 'a' can be calculated in order to obtain the 'Iin_desired' value. The switching frequency 'Fswitch' indicated at arrow 356 can then result from the processing operation performed by the switching converter unit 344.

For a DCM operation, according to equation (2) (i.e., the average current over a switching cycle), the value for 'a' can be calculated as shown in equation (6) below:

$$adcm = \frac{Ipeakh}{2 \cdot \text{Iav\_in}} \quad (6)$$

wherein equation (6) is only valid for a>=1. In CCM, equation (4) can hold. This means that 'a' can be calculated as shown in equation (7):

$$accm = 2 - \frac{2 \cdot \text{Iav\_in}}{Ipeakh} \quad (7)$$

Note that equation (7) may be only valid for a<=1.

Figure 11:
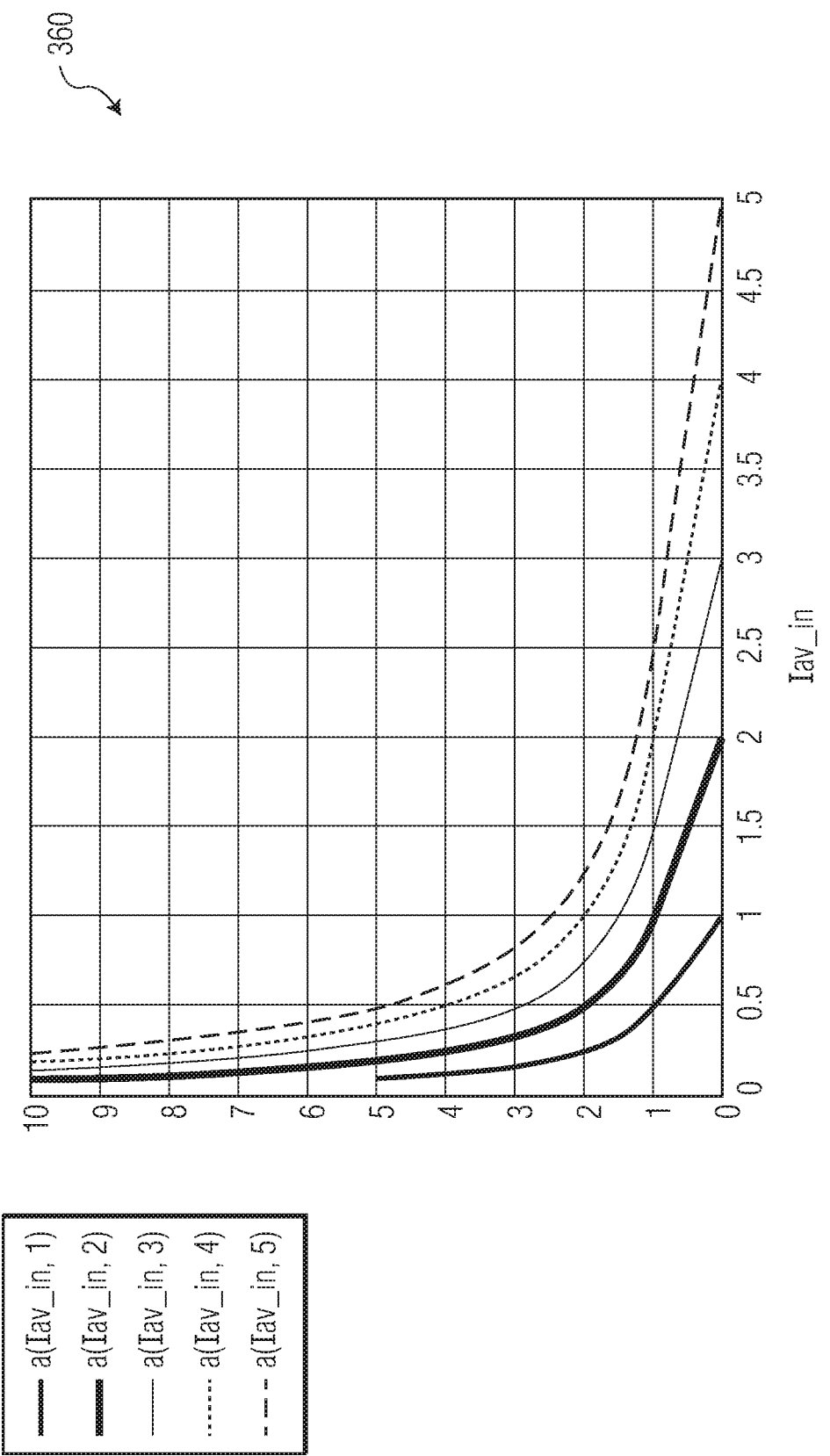
FIG. 11 depicts a graph depicting data indicative of calculated results for a=F(Iav_in, Ipeakh) for Ipeakh=1, 2, 3, 4, 5 ampere.

For Iav_in =0.5×Ipeakh, equation (6) and equation (7) can offer the same result of a=1. Thus, based on the desired currents 'Ipeakh' and 'IaV_in' value, for example, the first 'adcm' can be calculated. If adcm>1, then adcm can be taken, else 'accm' can be calculated and used as the result. FIG. 11 depicts a graph 360 illustrating example data indicative of a calculated result for a=F(Iav_in, Ipeakh) for Ipeakh=1, 2, 3, 4, 5 ampere.

Beside the ratio 'a', the peak current 'Ipeakl' may also need to be calculated. For Ipeakl=F(a,Ipeakh), the following equation can hold:

$$Ipeakl = 0$$

if $a >= 1$ $$Ipeakl = Ipeakh \cdot (1-a)$$

if $0 < a < 1$

Figure 12:
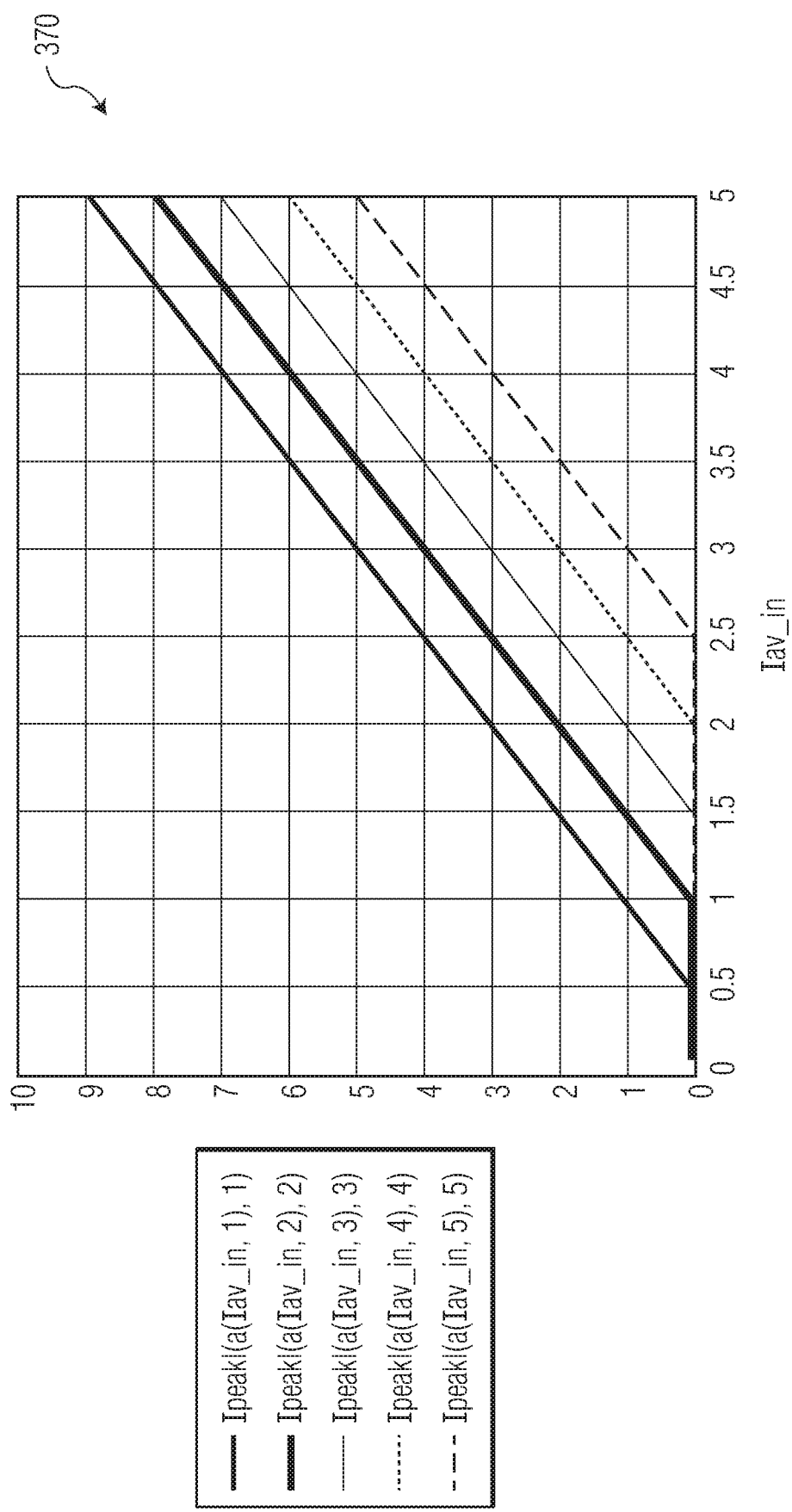
FIG. 12 depicts a graph depicting data indicative of Ipeakl=F(a,Ipeakh), wherein a=F(Iav_in,Ipeakh) according to FIG. 11.

FIG. 12 depicts a graph 370 depicting data indicative of Ipeakl=F(a,Ipeakh), wherein a=F(Iav_in,Ipeakh) can be determined according to FIG. 11. In this embodiment, the switching frequency may be a result and not a desired value. In a PFC application, switching frequencies in the audible range may not be allowed because of audible noise generation. Therefore, it may not always be possible to fulfill the desired 'Ipeakh' value when the switching frequency becomes too low. In this case, 'Ipeakh' can be reduced to a value wherein the value of the switching frequency may only be above the audible limit.

According to equation (1), the switching frequency may be given as:

$$Fswitch = \frac{Fbcm}{a}$$

For Fbcm, equation (8) can be derived:

$$Fbcm = \frac{Vin \cdot (Vout - Vin)}{Ipeakh \cdot Lind \cdot Vout} \quad (8)$$

Therefore based on equation (1) and equation (8), it can follow that 'Fswitch' may be inversely proportional to 'a' and 'Ipeakh'. So, if at the desired 'Ipeakh' and 'Iav_desired', the resulting 'Fswitch' is below the audible limit, and 'Ipeakh' can be reduced to a value that keeps 'Fswitch' above the audible limit as shown by equation (9):

$$Fswitch = \frac{Fbcm}{a} = \frac{Vin \cdot (Vout - Vin)}{a \cdot Ipeakh \cdot Lind \cdot Vout} \quad (9)$$

Then, using the equation for a=F(Iav_in, Ipeakh) (see equation (6) and equation (7)), the equation for the switching frequency can be derived for CCM and DCM operations as shown in equation (10) and equation (11) below.

$$Fsw = \frac{Vin \cdot (Vout - Vin)}{\frac{Ipeakh}{2 \cdot Iav\_in} \cdot Ipeakh \cdot Lind \cdot Vout} \quad dcm \quad (10)$$

$$Fsw = \frac{Vin \cdot (Vout - Vin)}{\left(2 - \frac{2 \cdot Iav\_in}{Ipeakh}\right) \cdot Ipeakh \cdot Lind \cdot Vout} \quad ccm \quad (11)$$

Figure 13:
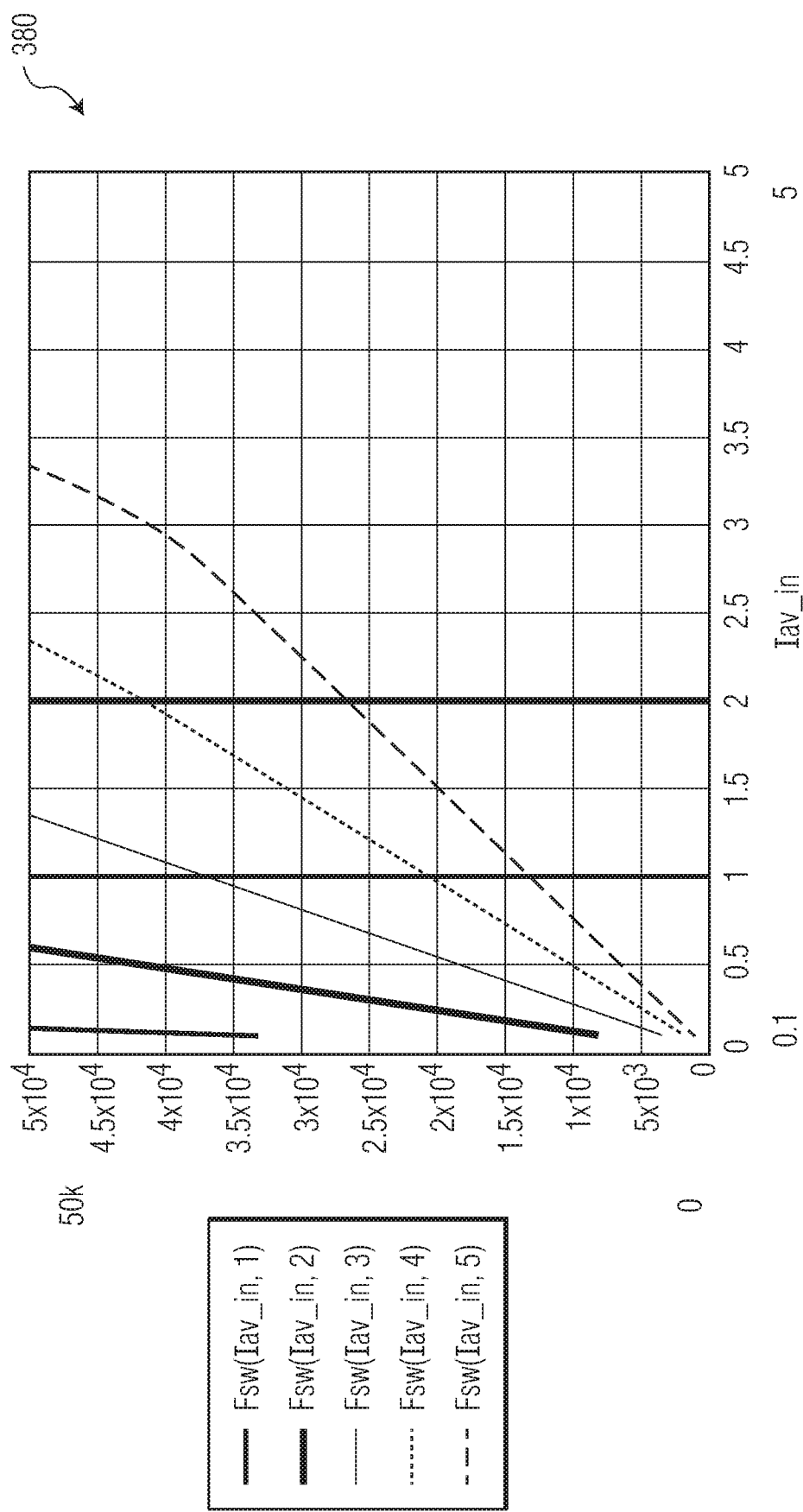
FIG. 13 depicts a graph of data indicating the pointing at which a switching frequency drops below an audible limit.

Based on the formulation of a=F(Iav_in, Ipeakh), which is also depicted in the context of the graph 360 of FIG. 11, and 'Ipeakh', the graph 380 shown in FIG. 13 can be plotted.

That is, the graph 380 in FIG. 13 depicts level of 'Iav_in', which can be the level wherein the switching frequency drops below the audible limit of, for example, 20 khz. For Ipeakh=5 A, this audible limit may be crossed at Iav_in=1.5 A, while a CCM border occurs at 2.5 A. In addition, for Ipeak=4 A, this audible limit can be crossed at Iav_in=0.95 A while the CCM border occurs at 2 A. Also, for Ipeak=2 A, this audible limit can be crossed at Iav_in=0.24 A while the CCM border can occur at 1 A.

Thus, an audible limit may occur in DCM mode. This means we can use equation (12) for the DCM operation:

$$Fsw = -\frac{Iav\_in}{Ipeakh^2} \cdot \frac{2 \cdot Vin \cdot (Vout - Vin)}{(Lind \cdot Vout)} \quad (12)$$

From equation (12), it is clear that the switching frequency may depend on the input voltages Vin and Vout and the inductance Lind and can depend on the average input current 'Iav_in' and the average peak current 'Ipeakh' squared. This means that 'Ipeakh/sqrt(Iav_in)' may be almost constant. Thus, when reducing the average input current 'Iav_in' at a given 'Ipeakh level', the switching frequency may be proportional to the average input current 'Iav_in' and at a certain level the switching frequency may become audible. Then, the switching frequency can be maintained at a value just above the audible limit by reducing 'Ipeakh' such that 'Iav_in/Ipeakh$^2$' remains constant. Thus, an embodiment can be implemented wherein the desired 'Ipeakh' value can be multiplied by a correction factor based on a ratio of 'Fswitch' and 'Fswitch_lim' (see FIG. 14).

Figure 14:
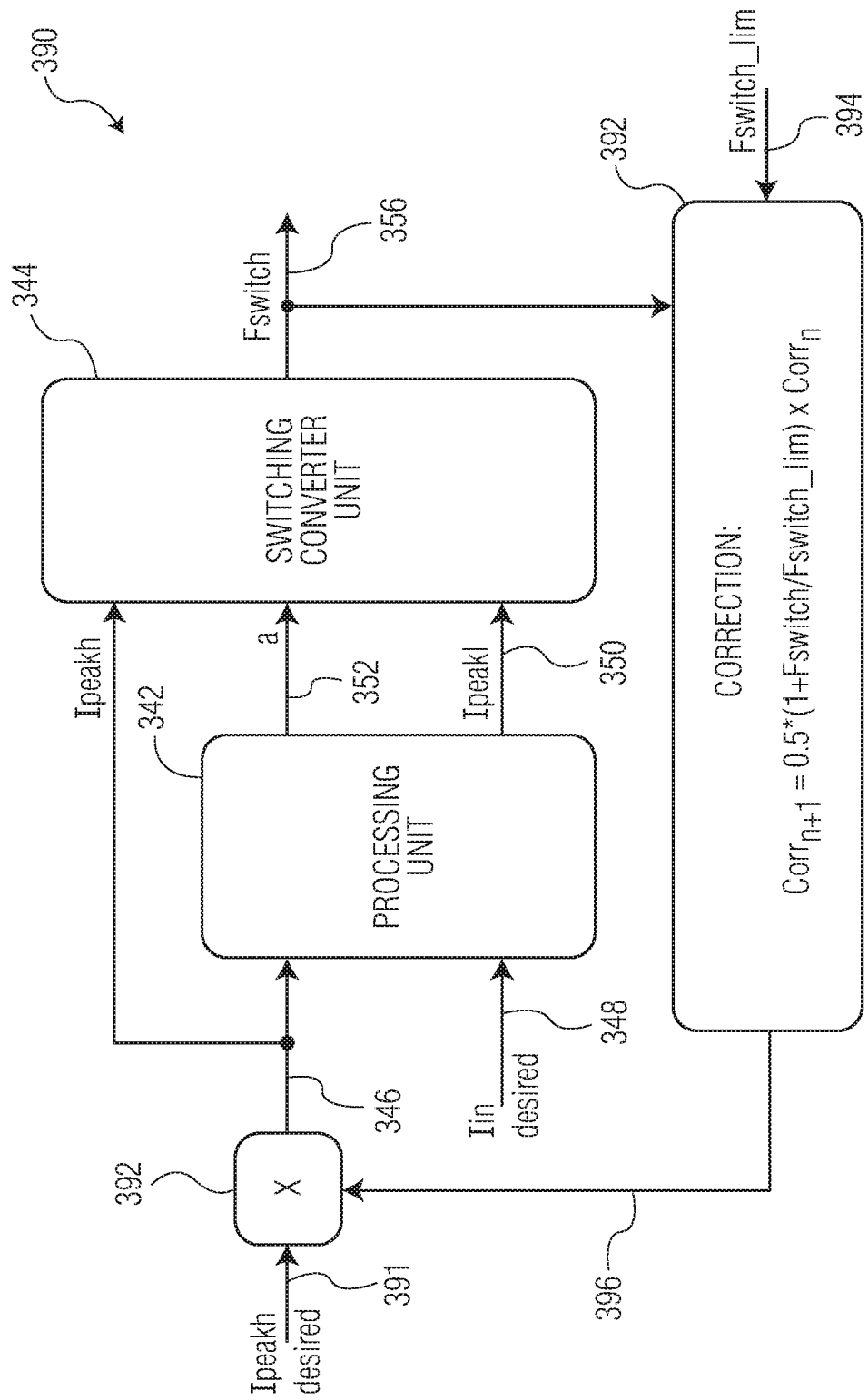
FIG. 14 depicts a block diagram of a PFC system that includes that utilizes a correction element with respect to a processing unit and a switching converter unit.

FIG. 14 depicts a block diagram of a PFC system 390 that can include a correction element 392 with respect to a processing unit 342 and a switching converter unit 344. Note that in FIG. 14 and FIG. 10, identical or similar parts or elements are generally indicated by identical reference numerals. The embodiment shown in FIG. 14 is thus an alternative version of the embodiment depicted in FIG. 10.

As shown in FIG. 14, the desired input current, 'Iin_desired', as shown at arrow 348 can be input to the processing unit 342. The PFC system 390 can also include a multiplier 392 that can multiply data output from the correction element 398 as shown at arrow 396, by a desired peak current, 'ipeakh_desired', as shown at arrow 391. The output from the multiplier 392 can be provided as an input to the processing unit 342 as shown at arrow 346. In addition, this peak current 'ipeakh' can be input to the switching converter unit 344.

The output from the processing unit can include 'a' as shown at arrow 352 and 'ipeakl' as depicted at arrow 350. Thus, 'ipeakh', 'a', and 'ipeakl' can be input to the switching converter unit 344, as respectively indicated by arrows 346, 352, and 350. The switching frequency, 'Fswitch', can be output from the switching converter unit 356 as shown at arrow 356 and then fed as input to the correction element 392. Additionally, a switching frequency 'Fswitch_lim' can be provided as input to the correction element 392, as shown at arrow 394. Thus, the desired 'Ipeakh' value can be multiplied by a correction factor based on a ratio of 'Fswitch' and 'Fswitch_lim'.

For Fswitch>Fswitch_lim the correction factor is 1. For Fswitch lower than Fswitch_limit, the correction circuit can output a correction factor (e.g., a correction signal) in order to reduce the value of the desired peak current 'Ipeakh_desired' such that the switching frequency comes closer to the frequency switch limit—Fswitch_limit value. Therefore, a correction factor can be defined as shown in equation (13) below:

$$\text{correction} = (1 - \alpha) + \alpha \frac{Fswitch}{Fswitch\_lim} \qquad (13)$$

wherein the parameter a can represent a constant between 0 and 1. The preferred value of the correction factor equals a=0.5 giving a correction=0.5×(1+Fswitch/Fswitch_lim). The influence of the ratio Fswitch_lim/Fswitch can be reduced by a factor 0.5 in order to take into account the quadratic effect of the peak current 'Ipeakh' on the switching frequency compared to the linear effect of the average input current 'Iav_in'.

Thus, for example, if at the peak current 'Ipeakh', a desired frequency of 19 kHz occurs, while Fswitch_lim=20 kHz, the ratio Fswitch/Fswitch_lim=19/20=0.95. The output from the correction element 392 may then be 0.5×(1+0.95)= 0.975. Thus, the adapted 'Ipeakh' can be 0.975×the original value. This means that the switching frequency of the next cycle can then be $1/0.975^2 \times 19$ kHz=19.99 kHz according to equation (12). Therefore, this process can converge almost with a deadbeat response.

In addition to limiting the switching frequency to a minimum value, the principle of FIG. 14 can be used to limit the switching frequency to a maximum value. In this case the 'Ipeakh' level can be increased above the desired level by a multiplication based on a correction signal derives in a similar way from 'Fswitch' and a maximum switching frequency 'Fswitch_max' (see FIG. 15).

Figure 5:
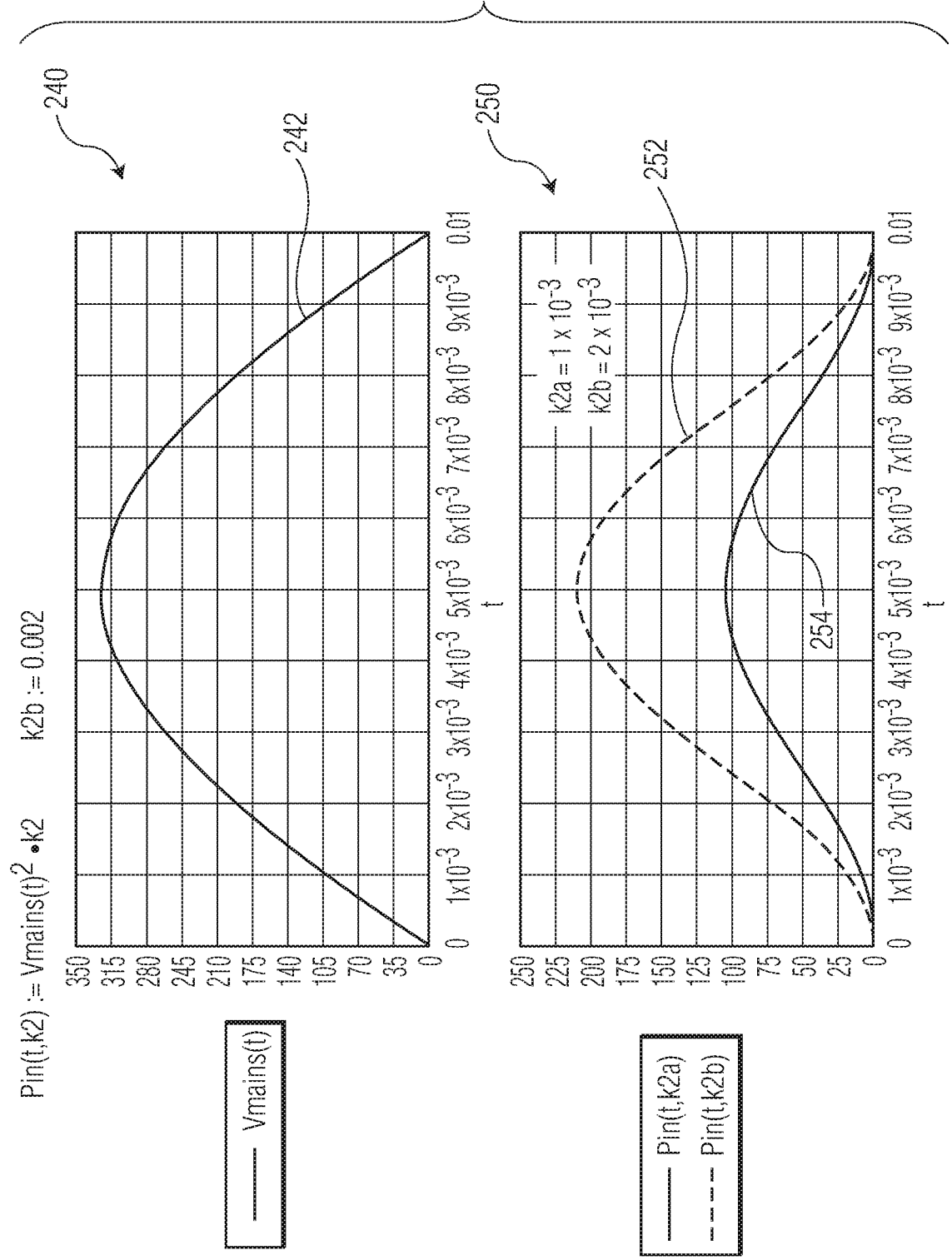
FIG. 5 depicts example graphs demonstrating the relationship between momentary current voltage and power for a PFC circuit.
Figure 6:
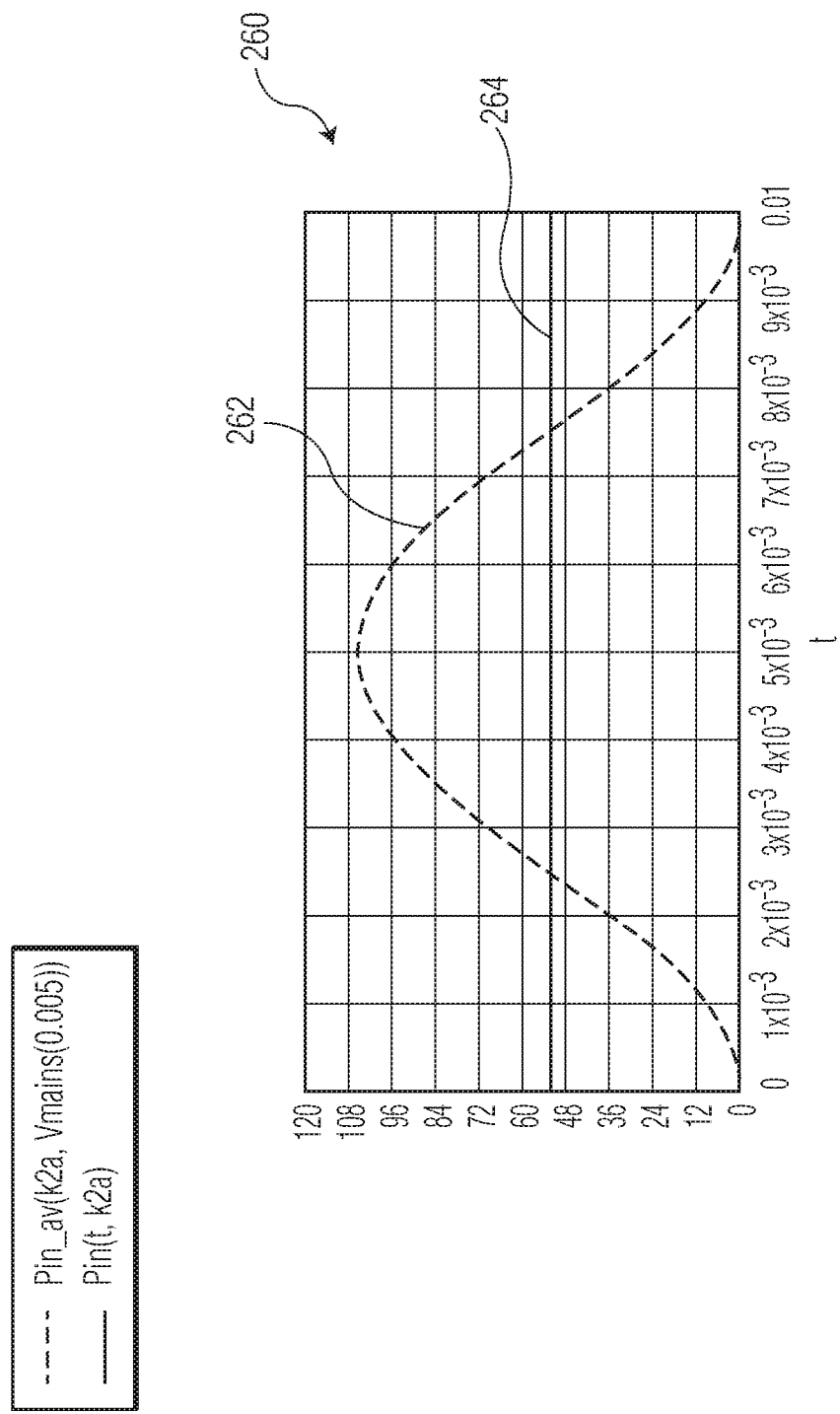
FIG. 6 depicts an example graph depicting average power over a mains half cycle for a PFC circuit.
Figure 15:
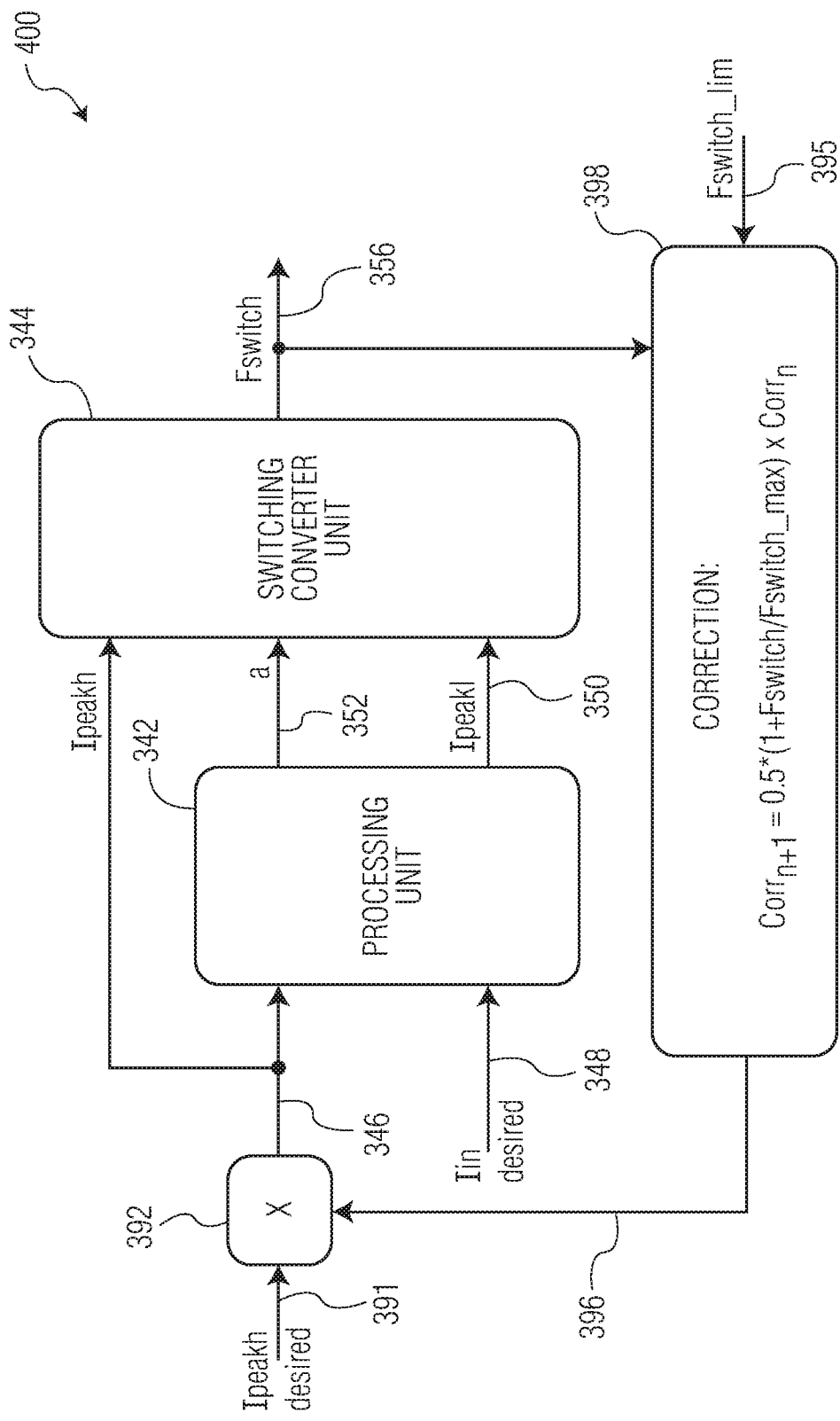
FIG. 15 depicts a block diagram of a PFC system that includes that utilizes a correction element with respect to a processing unit and a switching converter unit including the use of a maximum switching frequency.

FIG. 15 depicts a block diagram of a PFC system 400 that can include a correction element 392 with respect to a processing unit 342 and a switching converter unit 344 that can uses a maximum switching frequency, 'Fswitch_max', as shown at arrow 395. Note that in FIGS. 14-15 and FIG. 10, identical parts or elements can be indicated by identical reference numerals. The main difference between the configuration shown in FIG. 15 and the arrangement shown in FIG. 14 is the inclusion of the maximum switching frequency, 'Fswitch_max', indicated by arrow 395. In the configuration shown in FIG. 5, the maximum switching frequency, 'Fswitch_max', can be input to the correction element 392.

Figure 16:
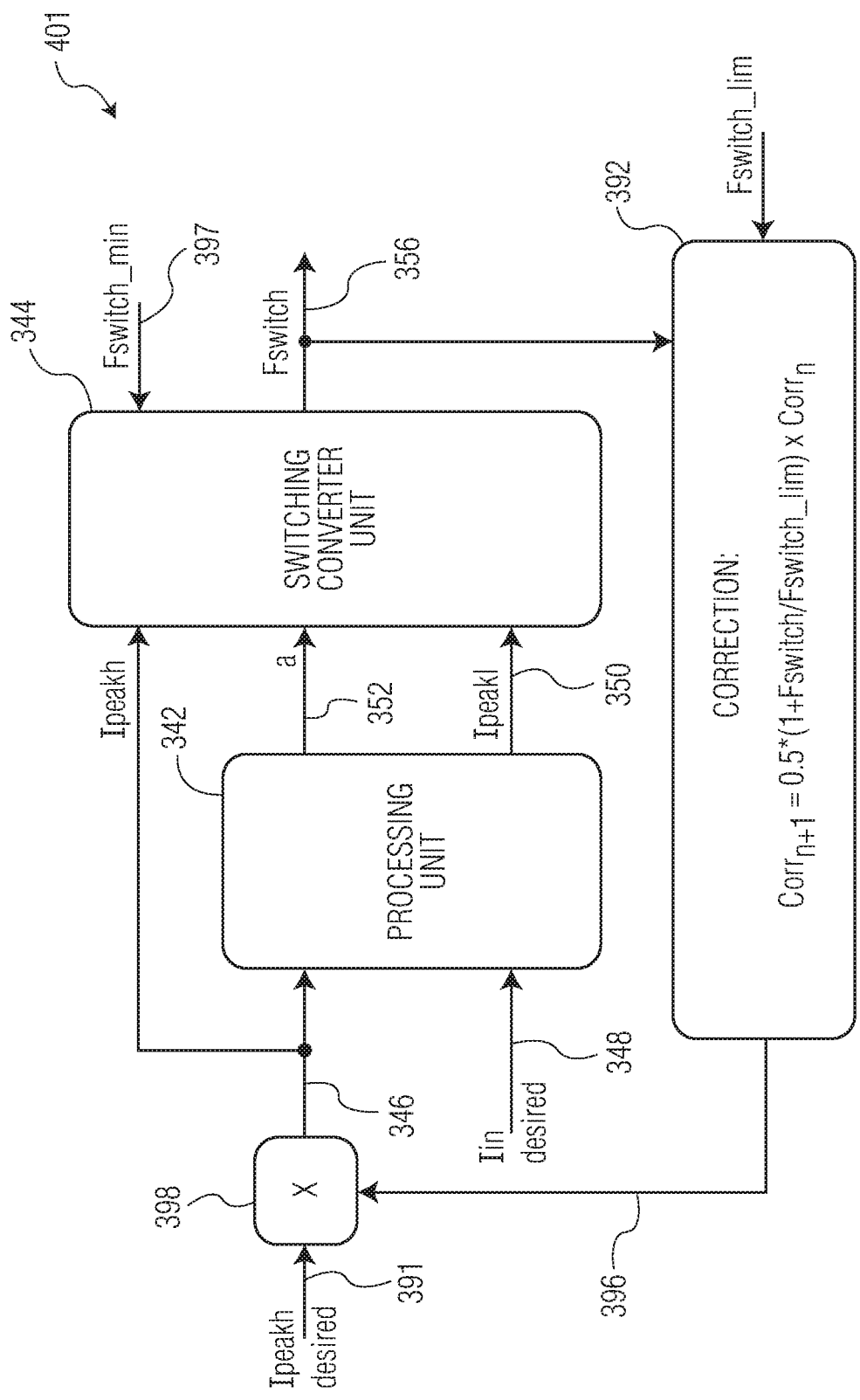
FIG. 16 depicts a block diagram of a PFC system that includes that utilizes a correction element with respect to a processing unit and a switching converter unit including the use of a minimum switching frequency.

FIG. 16 depicts a block diagram of a PFC system 401 that can include a correction element 392 with respect to a processing unit 342 and a switching converter unit 344. The PFC system 401 can include the use of a minimum switching frequency.

Note that in FIGS. 14-16 and FIG. 10, identical or similar parts or elements are generally indicated by identical reference numerals. The embodiments shown in FIGS. 14-16 are thus alternative versions of the embodiment depicted in FIG. 10. In the interest of brevity, all elements shown in FIGS. 14 and 15, for example, will not be repeated here. One difference between PFC system 401 shown in FIG. 16 and the PFC system 401 shown in FIG. 15, for example, can be the inclusion of the minimum switching frequency, Fswitch_min, as shown at arrow 397.

When a maximum switching frequency occurs, the system may be in a DCM operation or a CCM operation. In a CCM operation, the relation between 'Fswitch' and the average input current 'Iav_in' may become more complicated according to equation (11). By placing 'Vin', 'Vout' and 'Lind' under a constant k1, the equation (14) can be implemented for the CCM operation:

$$Fswitch = k1 \cdot \frac{1}{\left[\left(2 - \frac{2 \cdot \text{Iav\_in}}{Ipeakh}\right) \cdot Ipeakh\right]} \qquad (14)$$

which can simplify to equation (15):

$$Fswitch = k1 \cdot \frac{1}{2 \cdot (Ipeakh - \text{Iav\_in})} \qquad (15)$$

Here, the same principle for providing a correction term can be used optionally with a different α, although not in all cases where a deadbeat response may be achieved.

According to equation (12), the relation between 'Ipeak' and 'Fswitch' can also include a factor that can include an input voltage 'Vin' and an output voltage 'Vout'. Especially close to the zero crossing of the mains voltage, the relative change in 'Vin' can become larger from cycle to cycle. This means that the calculated correction factor can facilitate a lower than desired switching frequency when the mains voltage is reduced.

In the embodiment shown in FIG. 16, the switching converter unit 344 can operate with a minimum or limited hard frequency limit (see arrow 397) in order to prevent the switching frequency from becoming lower than a minimum frequency, even if the inputs (i.e., Ipeakh, Ipeakl, a) may result in a lower frequency.

Figure 17:
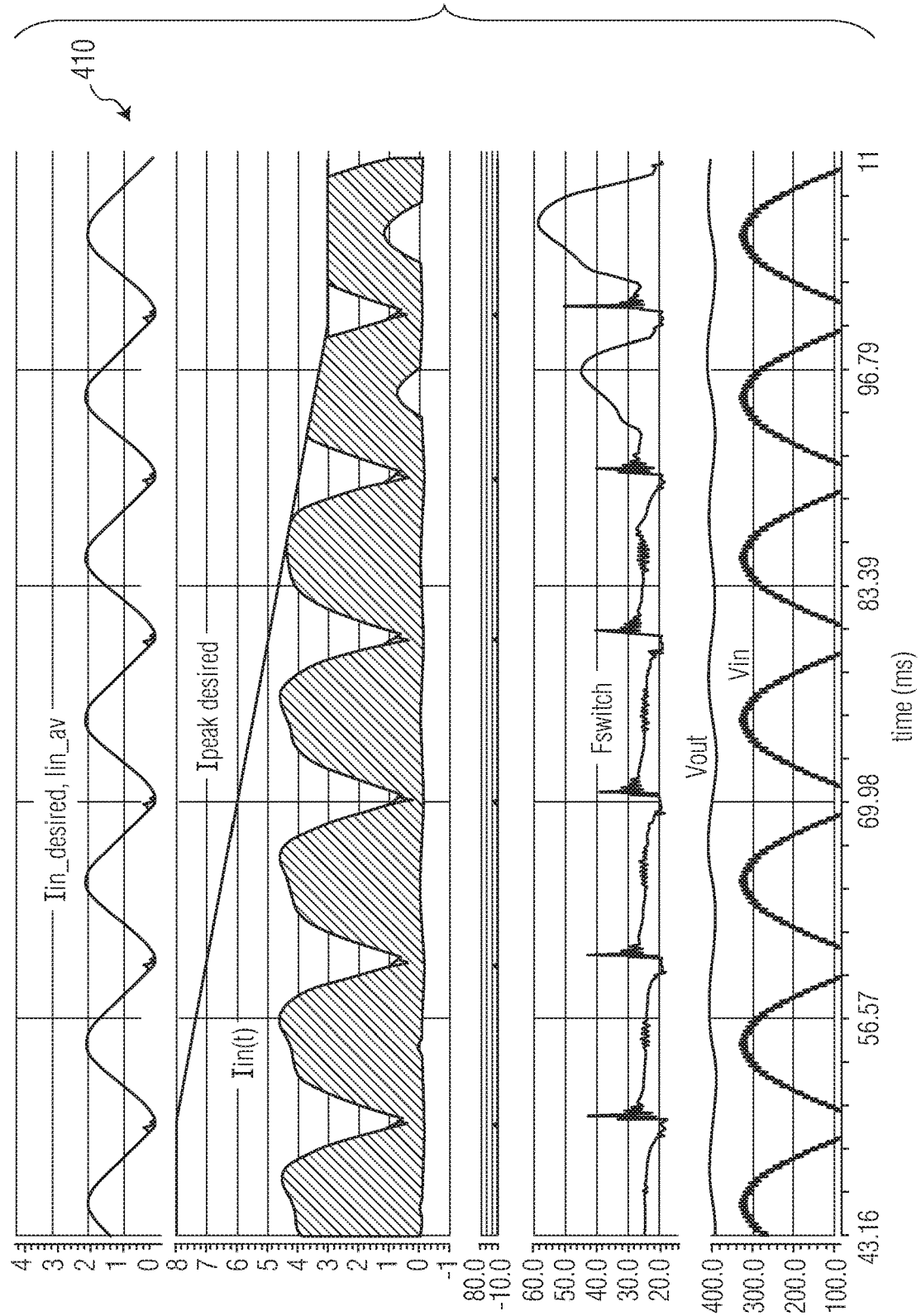
FIG. 17 depicts a graph of data indicative of a simulation of an embodiment including a frequency limitation and a minimum frequency.

For some applications it may be desirable to maintain the PFC in DCM operation. FIG. 17 depicts a graph 410 of data indicative of a simulation of an embodiment including an example frequency limitation at 25 khz and an example hard minimum frequency of 20 kHz.

The desired peak current, 'Ipeakh_desired', can be reduced in time to a value where the frequency is capable of being increased above the minimum frequency. By further reducing the desired peak current, 'Ipeak_desired', the system can continue to produce the desired input current. This means that below a certain value of 'Ipeak_desired', 'Ipeakl' may become larger than 0 in order to realize the desired input current. This also means that the factor 'a' can become smaller than 1.

According to an example embodiment, the 'Ipeakh' value can be limited to a minimum by a local loop that senses the actual value of 'a' and increases 'Ipeakh' until a situation occurs where a<b, where b is a constant preferably chosen as approximately 1.1. This ensures that the system can be kept in DCM operation with some margin to maintain valley switching.

Beside standard PFC, the embodiments can also be used in combination with other PFC topologies, such as, for example an interleaved PFC or a bridgeless boost PFC.

Figure 18:
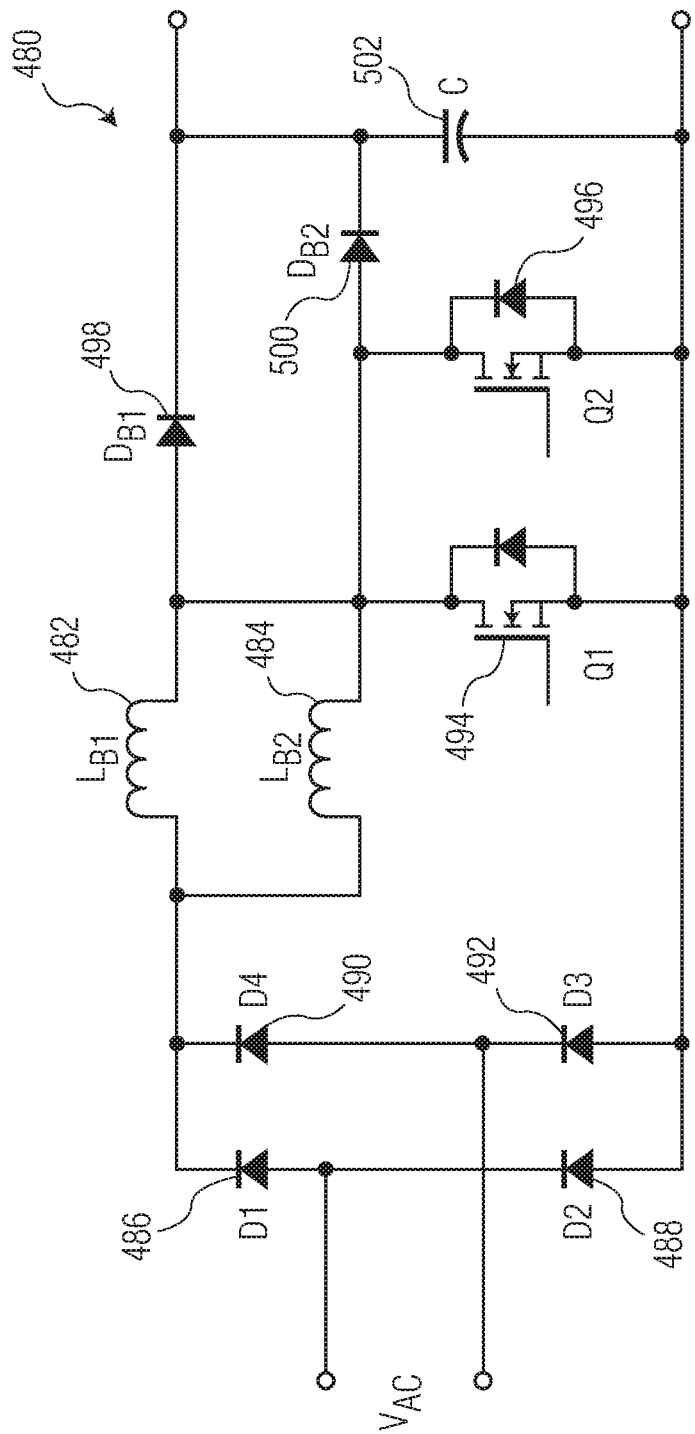
FIG. 18 depicts a schematic diagram of an interleaved PFC circuit.

FIG. 18 depicts a schematic diagram of an interleaved PFC circuit 480 that can be implemented in accordance with an embodiment. The PFC circuit 480 can include two inductors 482 ($L_{B1}$) and 484 ($L_{B2}$), which can be arranged in parallel with one another. The inductor 482 can be coupled to a diode 498 ($D_{B1}$) and a transistor 494 (Q1). The inductor 484 can be connected to a transistor 496 (Q2) and a diode 500 ($D_{B2}$). The diode 498 and the diode 500 can be further coupled to a capacitor 502. The transistors 494 and 496 can also connect to the capacitor 502. The PFC circuit 480 can further include a diode 486 (D1) and a diode 490 (D4) along with diodes 488 (D2) and 492 (D3).

The diodes 486 and 490 can be coupled to the inductors 482 and 484. The diodes 488 and 492 can connect respectively to the diodes 486 and 490, and also to the one another and the transistors 494 and 496 and the capacitor 502. The AC voltage $V_{AC}$ can be input at the interface between diodes 486, 488 and 490, 492 as shown in FIG. 18. The output of the PFC circuit 480 can be taken at the capacitor 502.

Figure 19:
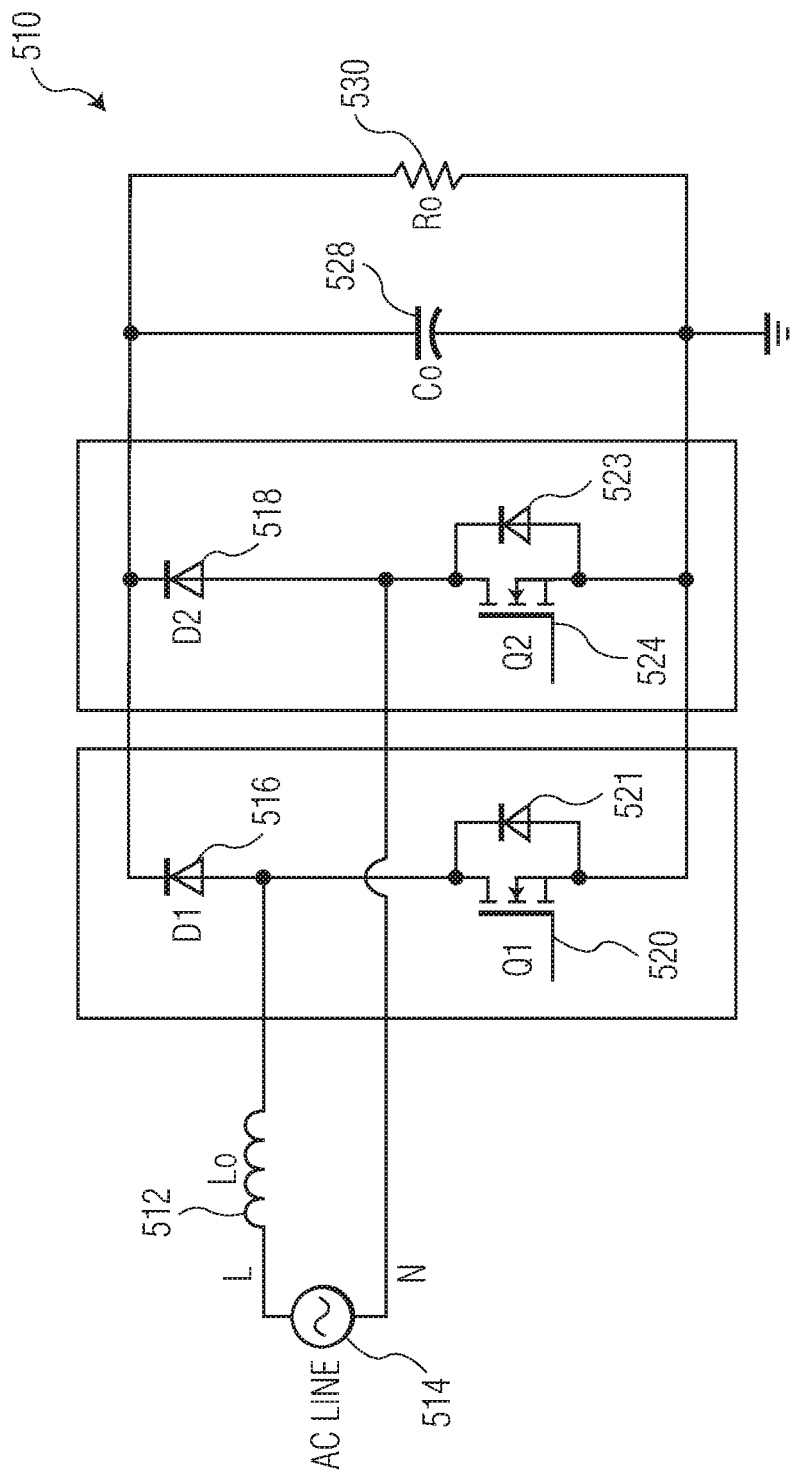
FIG. 19 depicts a schematic diagram of a bridgeless boost PFC.

FIG. 19 depicts a schematic diagram of a bridgeless boost PFC circuit 510 that can be implemented in accordance with another embodiment. The bridgeless boost PFC circuit 510 shown in FIG. 19 can include two diodes 516 (D1) and 518 (D2) that are coupled to one another and to a capacitor 528 (Co) and a resistor 530 (Ro). The capacitor 528 and the resistor 530 can be arranged in parallel with one another. A transistor 520 (Q1) can be implemented in parallel with a diode 521, and a transistor 524 (Q2) can be arranged in parallel with a diode 523. The diode 516 can be coupled to the transistor 520 and the diode 521, while the diode 518 can be coupled to the transistor 524 and the diode 523. The bridgeless boost PFC circuit 510 further can include an inductor 512 (Lo) that can connect to the diode 516 and the transistor 520 and diode 521, and also to an AC voltage source 514 ("AC Line"). The diode 518 can be further coupled to the transistor 524 and the diode 523, and also the AC voltage source 516. For the PFC circuit 480 and the bridgeless boost PFC circuit 510), it may be possible to sense the inductor current and to control the power.

The disclosed embodiments can offer a number of unique features and advantage. For example, the disclosed approach can be utilized to implement a PFC that operates in DCM or CCM operation where two or more desired input variables are defined and an method used, which that takes care of adapting corresponding variables in the PFC to adapt to the desired input variables. In some example embodiments, the two input variables constitute the desired peak current and the desired input current and the two corresponding variables are the peak current and the input current.

Additionally, as discussed herein, a method can be utilized based on an estimation of partial derivatives and solving a set of two equations using the partial derivatives. Such a method can further involve applying a first peak current ('Ipeakh') according to the desired peak current, calculating a second peak current ('Ipeakl') based on the first peak current and desired input current ('Iin_desired'), calculating a ratio ('a'), and driving the switching converter unit using the applied and calculated values.

Additionally, in some embodiments the measured operating frequency and a lower frequency limit can be used to determine a correction factor that is used to adapt the desired first peak current to a value such that the resulting switching frequency is a better fit with respect to the lower frequency limit.

The measured operating frequency and the upper frequency limit can also be used to determine a correction factor. The correction factor can be employed to adapt the desired first peak current to a value such that the resulting switching frequency is a bitter fit with respect to the upper frequency limit.

Additionally, in some embodiments, a hard minimum operating frequency can be used. Also, the peak current value, Ipeakh, can be limited to a minimum by a local loop that senses how far the converter operates in DCM and increases Ipeakh until a situation occurs where a certain amount of DCM operation is maintained. In some embodiments, the switching converter unit 344 can include, for example, a boost converter, a bridgeless PFC or an interleaved boost converter.

The disclosed approach thus can solve sets of equations using partial derivatives. It can be appreciated based on FIG. 10 that 'Ipeakh' and 'I_desired' can be inputs and that the processing unit 342 can calculate the resulting factor 'a' to fulfill 'Ipeakh' and 'I_desired'. Two equations can be employed for calculating 'a'. Equation (6) can be used for a DCM operation and equation (7) can be used for a CCM operation. If 'a' is calculated based on the CCM equation then the resulting 'a' should be <1 and the same holds for the DCM equation a>1. If a>1 when using CCM equation then this means that the equation may not be valid and the other equation should be used. This also holds for the DCM equation. Thus, based on that the resulting 'a' and the 'Ipeakl' level can be calculated. For a DCM operation, Ipealk=0 and for CCM, Ipeakl=Ipeakh×(1−a). This is basically a function of the processing unit 342 depicted in of FIG. 10. The above description essentially covers the first part of the disclosed approach.

The second part of the disclosed approach can be explained by reference to FIG. 14, FIG. 15, and FIG. 16, which indicate that additional measures can be taken to reduce or increase 'Ipeakh' when the operating frequency is too large or too small. Reducing or increasing 'Ipeakh', while still maintaining 'Iin_desired', can maintain the desired input current while shifting the switching frequency to a desired lower or higher value.

In addition to acting when the switching frequency is out of range (e.g., FIG. 15 too large or FIG. 16 too small), the switching frequency can be regulated to a desired value (e.g., FIG. 14). Therefore the correction term correction=0.5×(1+Fswitch/Fswitch_lim) can be used. This correction adapts Ipeakh by 1%, for example, when Fswitch deviates 2% from the desired value.

In order to make clear why this factor 0.5×(1+Fswitch/Fswitch_lim) can be used instead of, for example, a factor Fswitch/Fswitch_lim (this would give 1% change in ipeakh when Fswitch deviates 1% from the desired value), equation (12) and equation (14) can be used to describe the relation between frequency and peak current at a given desired input current for the boost converter model in CCM and DCM. These equations can demonstrate that in DCM there is a quadratic relation between frequency and Ipeakh (equation 12). When 'Ipeakh' changes 1%, for example, the frequency can change by 2%, which can explain a need for using a correction term having an inverse behavior, which may prevent over reaction and instability.

The disclosed embodiments offer a number of advantages over conventional approaches. For example, with conventional approaches although it may be possible to configure a CCM PFC or a DCM PFC, but not combine them to configure a PFC for both DCM and CCM operations within the same mains half cycle. The disclosed approach solves this problem.

Other problems or disadvantages that can be overcome by the disclosed embodiments include the fact that the loop gain and dynamic behavior may be different in CCM and DCM for PFC's. This makes it more complex to define a closed loop and attain a dynamic performance. The disclosed embodiments can offer a solution to this problem. In addition, the disclosed embodiments can offer a solution to potential instabilities (short long cycles) that may occur in CCM for a duty cycle >50%.

The disclosed embodiments further can offer a solution to problems stemming from the fact that the operating frequency in BCM may result in undesired large frequencies during a part of the mains half cycle. These problems can be overcome by using a combination of a factor 'a' and a peak current 'Ipeak' in combination with a method for calculating the resulting 'Ipeakl' so as to fit a desired solution with calculations related to the timing of the switching cycles of a PFC.

The disclosed embodiments can be implemented in applications such as power supplies with power levels exceeding approximately 300 watts with a voltage load ranging between a low percentage voltage load to a full load where PFC functions may be needed with THD requirements. Examples of such applications include power supplies for gaming consoles, and PC desktops with higher power.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations and elements for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention and elements thereof may be implemented entirely in hardware or in an implementation containing hardware and software elements. In embodiments, which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A power factor corrector circuit, comprising:
    a power factor corrector,
    wherein at least two input variables are defined for the power factor corrector,
    wherein the at least two input variables include a peak current and a desired input current;
    a processor that selects corresponding variables in the power factor corrector with respect to the at least two input variables defined for the power factor corrector, and
    wherein the corresponding variables include a peak current and an input current, and
    wherein the corresponding variables in the power factor corrector are adapted to the at least two input variables to allow the power factor corrector to operate in a conduction mode;
    further comprising a switching converter unit that communicates with the processor,
    wherein:
        a first peak current is applied according to the peak current;
        a second peak current is calculated based on the first peak current and the input current;
        a factor is calculated based on the first peak current and the second peak current; and
        the switching converter unit is driven using the first peak current and the second peak current and at a start of a next primary stroke based on a measured duration of the primary and secondary stroke and the factor.

2. The power factor corrector circuit of claim 1 wherein the conduction mode comprises a DCM (Discontinuous-Conduction Mode).

3. The power factor corrector circuit of claim 1 wherein the conduction mode comprises a CCM (Continuous-Conduction Mode).

4. The power factor corrector circuit of claim 1 wherein the conduction mode comprises at least one of: a DCM (Discontinuous-Conduction Mode) and a CCM (Continuous-Conduction Mode).

5. The power factor corrector of claim 1:
    wherein a measured operating frequency and an upper frequency limit determine a correction factor that is operable to adapt the first peak current to a value that results in a switching frequency that fits to an upper frequency limit.

6. The power factor corrector of claim 5 wherein a minimum operating frequency is used to determine the correction factor.

7. The power factor corrector of claim 1:
    wherein the switching converter unit includes at least one of a boost converter circuit, a bridgeless power factor corrector circuit, and an interleaved boost converter circuit.

8. A power factor corrector circuit, comprising:
    a power factor corrector, wherein at least two input variables are defined for the power factor corrector,
    wherein the at least two input variables include a peak current and an input current;
    a processor that selects corresponding variables in the power factor corrector with respect to the at least two input variables defined for the power factor corrector, and
    wherein the corresponding variables include a peak current and an input current, and
    wherein the corresponding variables in the power factor corrector are adapted to the at least two input variables to allow the power factor corrector to operate in a conduction mode comprising at least one of a DCM (Discontinuous-Conduction Mode) and a CCM (Continuous-Conduction Mode);
    further comprising a switching converter unit that communicates with the processor,
    wherein:
        a first peak current is applied according to the peak current
        a second peak current is calculated based on the first peak current and the input current;

a factor is calculated based on the first peak current and the second peak current; and the switching converter unit is driven using the first peak current and the second peak current and at a start of a next primary stroke based on a measured duration of the primary and secondary stroke and the factor.

9. The power factor corrector of claim 8 wherein:

a measured operating frequency and an upper frequency limit determine a correction factor that is operable to adapt the first peak current to a value that results in a switching frequency that fits to an upper frequency limit; and a minimum operating frequency is used to determine the correction factor.

10. The power factor corrector of claim 8:

wherein the switching converter unit includes at least one of a boost converter circuit, a bridgeless power factor corrector circuit, and an interleaved boost converter circuit.

11. A method of operating a power factor corrector circuit, comprising:

defining at least two input variables for a power factor corrector, wherein the at least two input variables include a peak current and an input current;

selecting corresponding variables in the power factor corrector with respect to the at least two input variables defined for the power factor corrector, wherein the corresponding variables include a peak current and an input current; and adapting the corresponding variables in the power factor corrector to the at least two input variables to allow the power factor corrector to operate in a conduction mode;

applying a first peak current according to the peak current;

calculating a second peak current based on the first peak current and the input current;

calculating a factor based on the first peak current and the second peak current; and driving a switching converter unit using the first peak current and the second peak current and at a start of a next primary stroke based on a measured duration of the primary and secondary stroke and the factor.

12. The method of claim 11 wherein the conduction mode comprises a DCM (Discontinuous-Conduction Mode).

13. The method of claim 11 wherein the conduction mode comprises a CCM (Continuous-Conduction Mode).

14. The method of claim 11 wherein the conduction mode comprises at least one of: a DCM (Discontinuous-Conduction Mode) and a CCM (Continuous-Conduction Mode).

15. The method of claim 11:

wherein a measured operating frequency and an upper frequency limit determine a correction factor that is operable to adapt the first peak current to a value that results in a switching frequency that fits to an upper frequency limit.

16. The method of claim 15 wherein a minimum operating frequency is used to determine the correction factor.

17. The method of claim 11:

wherein a current peak value is limited to a minimum amount by a local loop that detects how the switching converter unit operates in the conduction mode and increases a peak current until a particular amount of the conduction mode is maintained.

* * * * *